(12) United States Patent
Yoshikawa et al.

(10) Patent No.: US 12,175,601 B2
(45) Date of Patent: Dec. 24, 2024

(54) SHOOTING METHOD, SHOOTING INSTRUCTION METHOD, SHOOTING DEVICE, AND SHOOTING INSTRUCTION DEVICE

(71) Applicant: Panasonic Intellectual Property Management Co., Ltd., Osaka (JP)

(72) Inventors: Satoshi Yoshikawa, Hyogo (JP); Toru Matsunobu, Osaka (JP); Kensho Teranishi, Osaka (JP); Masaki Fukuda, Osaka (JP); Ukyou Katsura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 17/943,415

(22) Filed: Sep. 13, 2022

(65) Prior Publication Data

US 2023/0005220 A1    Jan. 5, 2023

Related U.S. Application Data

(63) Continuation of application No. PCT/JP2021/012156, filed on Mar. 24, 2021.

(30) Foreign Application Priority Data

Mar. 30, 2020 (JP) .................................. 2020-059676
Oct. 27, 2020 (JP) .................................. 2020-179647

(51) Int. Cl.
*G06T 17/00* (2006.01)
*G06T 7/13* (2017.01)
(Continued)

(52) U.S. Cl.
CPC ................ *G06T 17/20* (2013.01); *G06T 7/13* (2017.01); *G06T 7/70* (2017.01); *G06V 10/25* (2022.01);
(Continued)

(58) Field of Classification Search
CPC ........... G06T 2207/10028; G06T 17/20; G06T 17/00; G06T 19/20; G06T 2210/56;
(Continued)

(56) References Cited

U.S. PATENT DOCUMENTS

2007/0172112 A1    7/2007  Paley et al.
2014/0293016 A1*  10/2014  Benhimane ............. G06T 7/246
                                                                348/50
(Continued)

FOREIGN PATENT DOCUMENTS

JP    2008-89410     4/2008
JP    2010-256253    11/2010
(Continued)

OTHER PUBLICATIONS

Partial Supplementary European Search Report issued Aug. 4, 2023 in corresponding European Patent Application No. 21780793.2.
(Continued)

*Primary Examiner* — Hau H Nguyen
(74) *Attorney, Agent, or Firm* — Wenderoth, Lind & Ponack, L.L.P.

(57) ABSTRACT

A shooting method executed by a shooting device includes: shooting first images of a target space; generating a first three-dimensional point cloud of the target space, based on the first images and a first shooting position and a first shooting orientation of each of the first images; and determining a first region of the target space for which generating a second three-dimensional point cloud which is denser than the first three-dimensional point cloud is difficult, using the
(Continued)

first three-dimensional point cloud and without generating the second three-dimensional point cloud. The determining includes generating a mesh using the first three-dimensional point cloud, and determining the region other than a second region of the target space for which the mesh is generated.

18 Claims, 29 Drawing Sheets

(51) Int. Cl.
*G06T 7/70* (2017.01)
*G06T 17/20* (2006.01)
*G06V 10/25* (2022.01)
*G06V 10/74* (2022.01)

(52) U.S. Cl.
CPC .. *G06V 10/761* (2022.01); *G06T 2207/10028* (2013.01); *G06T 2207/30244* (2013.01)

(58) Field of Classification Search
CPC ....... G06T 2200/08; G06T 2207/30244; G06T 15/10; G06T 7/50; G06T 7/80; G06T 7/55; G06T 7/521; G06T 7/11; G06T 7/70; G06T 17/205; G06T 2200/04; G06T 1/0007; G06T 19/00; G06F 18/253; G06F 18/22
See application file for complete search history.

(56) References Cited

U.S. PATENT DOCUMENTS

| 2016/0086343 | A1 | 3/2016 | Namiki et al. |
| 2017/0154462 | A1* | 6/2017 | von Cramon .......... H04N 23/56 |
| 2019/0108679 | A1* | 4/2019 | Wang ...................... G06T 7/344 |
| 2019/0253614 | A1 | 8/2019 | Oleson et al. |
| 2020/0357177 | A1* | 11/2020 | Park ........................ G06F 3/011 |

FOREIGN PATENT DOCUMENTS

| JP | 2016-61687 | 4/2016 |
| JP | 2017-130146 | 7/2017 |

OTHER PUBLICATIONS

Extended European Search Report issued Oct. 9, 2023 in corresponding European Patent Application No. 21780793.2.

Dimitri Bulatov et al., "Multi-view dense matching supported by triangular meshes", ISPRS Journal of Photogrammetry and Remote Sensing, vol. 66, No. 6, Jun. 2011, pp. 907-918.

International Search Report (ISR) issued on Jun. 29, 2021 in International (PCT) Application No. PCT/JP2021/012156.

* cited by examiner

SHOOTING METHOD, SHOOTING INSTRUCTION METHOD, SHOOTING DEVICE, AND SHOOTING INSTRUCTION DEVICE

CROSS REFERENCE TO RELATED APPLICATIONS

This is a continuation application of PCT International Application No. PCT/JP2021/012156 filed on Mar. 24, 2021, designating the United States of America, which is based on and claims priority of Japanese Patent Application No. 2020-059676 filed on Mar. 30, 2020 and Japanese Patent Application No. 2020-179647 filed on Oct. 27, 2020. The entire disclosures of the above-identified applications, including the specifications, drawings and claims are incorporated herein by reference in their entirety.

FIELD

The present disclosure relates to shooting instruction methods, shooting methods, shooting instruction devices, and shooting devices.

BACKGROUND

Patent Literature (PTL) 1 discloses a technique of generating a three-dimensional model of a subject, using images obtained by shooting the subject from a plurality of viewpoints.

CITATION LIST

Patent Literature

PTL 1: Japanese Unexamined Patent Application Publication No. 2017-130146

SUMMARY

A shooting method according to an aspect of the present disclosure is a shooting method executed by a shooting device, and includes: shooting first images of a target space; generating a first three-dimensional point cloud of the target space, based on the first images and a first shooting position and a first shooting orientation of each of the first images; and determining a first region of the target space for which generating a second three-dimensional point cloud is difficult, using the first three-dimensional point cloud and without generating the second three-dimensional point cloud, the second three-dimensional point cloud being denser than the first three-dimensional point cloud, wherein the determining includes: generating a mesh using the first three-dimensional point cloud; and determining the region other than a second region of the target space, the second region being a region for which the mesh is generated.

A shooting instruction method according to an aspect of the present disclosure is a shooting instruction method executed by a shooting instruction device, and includes: displaying a first image of a subject on which recognition of attributes is performed; getting input to specify a first attribute among the attributes to specify a first region in order to generate a three-dimensional model of the subject, based on second images generated by shooting the subject and on a shooting position and a shooting orientation of each of the second images; and outputting at least one of a shooting position or a shooting orientation so that a third image to be used in generating a first three-dimensional model of the first region specified is shot.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
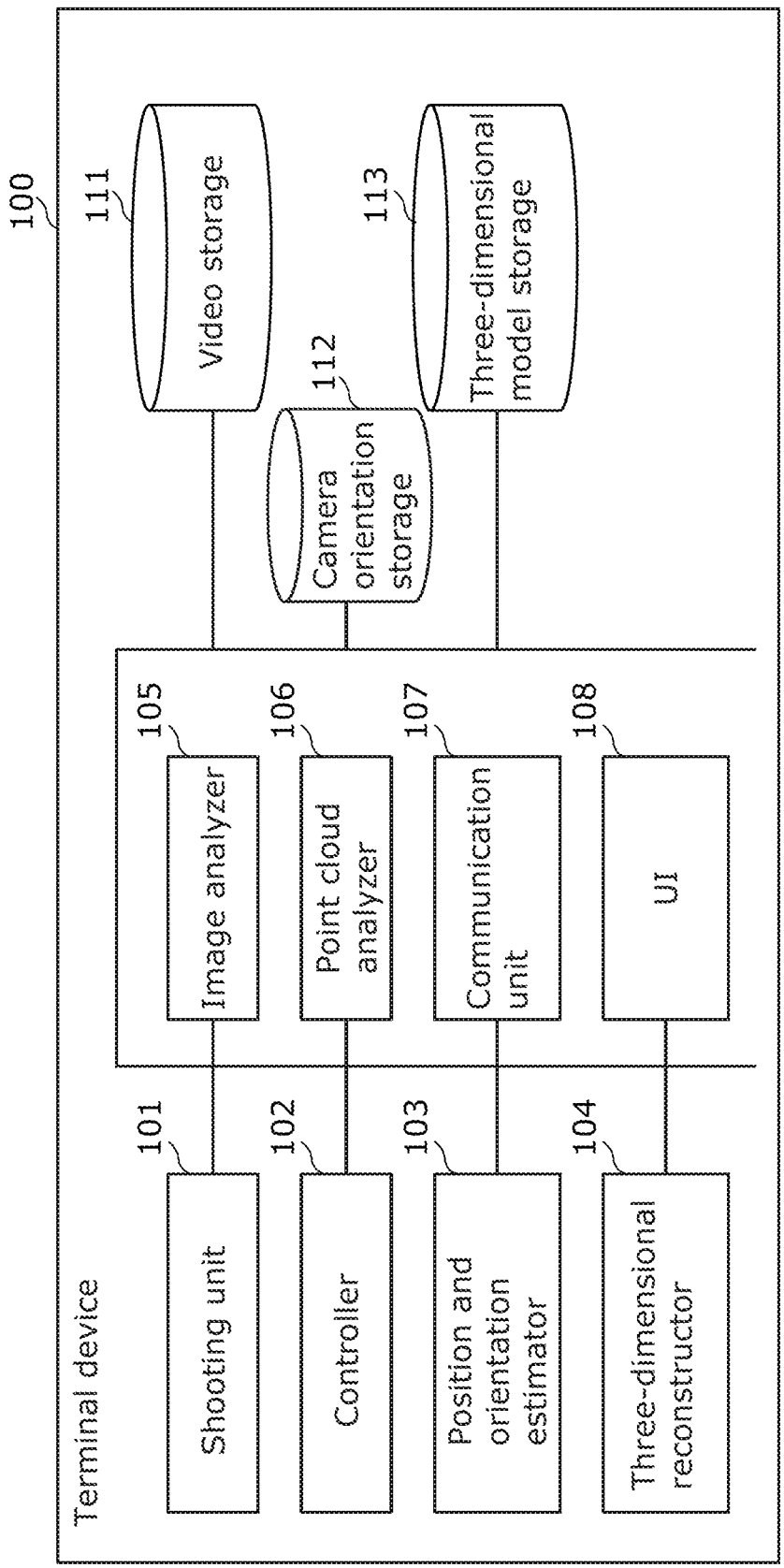
FIG. 1 is a block diagram illustrating a terminal device according to Embodiment 1.

A shooting instruction method according to an aspect of the present disclosure is a shooting instruction method executed by a shooting instruction device, and includes: getting input to specify a first region in order to generate a three-dimensional model of a subject, based on images generated by shooting the subject and on a shooting position and a shooting orientation of each of the images; and instructing at least one of a shooting position or a shooting orientation so that an image to be used in generating a three-dimensional model of the first region specified is shot.

Accordingly, since the precision of the three-dimensional model of the region required by the user can be preferentially improved, the precision of the three-dimensional model can be improved.

For example, the shooting instruction method includes: detecting a second region for which generating of the three-dimensional model is difficult, based on the images, the shooting positions, and the shooting orientations; and instructing at least one of a shooting position or a shooting orientation so that an image which facilitates generating of a three-dimensional model of the second region is generated. In the instructing corresponding to the first region, the at least one of the shooting position or the shooting orientation is instructed shoots that the image which facilitates the generating of the three-dimensional model of the first region is shot.

The shooting instruction method further includes: displaying an image of the subject on which recognition of an attribute has been performed. In the getting of input to specify the first region, input of the attribute is gotten.

For example, the detecting of the second region may include: (i) calculating an edge, on a two-dimensional image, for which an angular difference with an epipolar line based on the shooting position and the shooting orientation is smaller than a predetermined value; and (ii) detecting, as the second region, a three-dimensional region corresponding to the edge calculated. In the instructing corresponding to the second region, the at least one of the shooting position or the shooting orientation may be instructed shoots that an image for which the angular difference is bigger than the predetermined value is shot.

For example, the images may be frames included in a moving image that is currently being shot and displayed, and the instructing corresponding to the second region may be performed in real time.

Accordingly, shooting instruction can be performed in real time, and thus user convenience can be improved.

For example, in the instructing corresponding to the second region, a shooting direction may be instructed.

Accordingly, the user can easily perform ideal shooting following the instruction.

For example, in the instructing corresponding to the second region, a shooting region may be instructed.

Accordingly, the user can easily perform ideal shooting following the instruction.

A shooting instruction device according to an aspect of the present disclosure includes: a processor; and memory, wherein input to specify a first region is gotten in order to generate a three-dimensional model of a subject, based on images generated by shooting the subject and on a shooting position and a shooting orientation of each of the images; and at least one of a shooting position or a shooting orientation is instructed shoots that an image to be used in generating a three-dimensional model of the first region specified is shot.

Accordingly, since the precision of the three-dimensional model of the region required by the user can be preferentially improved, the precision of the three-dimensional model can be improved.

A shooting instruction method according to an aspect of the present disclosure includes: detecting, based on images generated by shooting a subject and a shooting position and a shooting orientation of each of the images, a region for which generating of a three-dimensional model of the subject which uses the images is difficult; and instructing at least one of a shooting position or a shooting orientation shoots that an image which facilitates generating of a three-dimensional model of the region detected is shot.

Accordingly, the precision of the three-dimensional model can be improved.

For example, the shooting instruction method may further include: getting input to specify a priority region, and, in the instructing, the at least one of the shooting position or the imaging orientation may be instructed so that an image which facilitates generating of a three-dimensional model of the priority region specified is shot.

Accordingly, the precision of the three-dimensional model of the region required by the user can be preferentially improved.

A shooting method according to an aspect of the present disclosure is a shooting method executed by a shooting device, and includes: shooting first images of a target space; generating first three-dimensional position information of the target space, based on the first images and a first shooting position and a first shooting orientation of each of the first images; and determining a second region of the target space for which generating second three-dimensional position information is difficult, using the first three-dimensional position information and without generating the second three-dimensional position information, the second three-dimensional position information being more detailed than the first three-dimensional position information.

According to the shooting method, since the second region for which generating the second three-dimensional position information is difficult can be determined using the first three-dimensional position information without generating the second three-dimensional position information, the efficiency of shooting of images used for generating the second three-dimensional position information can be improved.

For example, the second region may be at least one of a region in which shooting of an image is not performed or a region for which precision of the second three-dimensional position information is estimated to be lower than a predetermined standard.

For example, the first three-dimensional position information may include a first three-dimensional point cloud, and the second three-dimensional position information may include a second three-dimensional point cloud which is denser than the first three-dimensional point cloud.

For example, in the determining, a third region of the target space which corresponds to a region in a vicinity of the first three-dimensional point cloud may be determined, and a region other than the third region may be determined as the second region.

For example, the determining may include: generating a mesh using the first three-dimensional point cloud; and determining a region other than the third region of the target space as the second region, the third region corresponding to a region in which the mesh is generated.

For example, in the determining, the second region may be determined based on a reprojection error of the first three-dimensional point cloud.

For example, the first three-dimensional position information may include a depth image, and, in the determining, a region within a predetermined distance from a shooting viewpoint may be determined as a third region, and a region other than the third region may be determined as the second region.

For example, the shooting method may further include combining, using second images that have already been shot, a second shooting position and a second shooting orientation of each of the second images, the first images, and the first shooting positions and the first shooting orientations, coordinate systems of the first shooting positions and the first shooting orientations with coordinate systems of the second shooting positions and the second shooting orientations.

Accordingly, determining of the second region can be performed using information obtained by a plurality of shootings.

For example, the shooting method may further include displaying the second region or a third region other than the second region during shooting of the target space.

Accordingly, the second region can be presented to the user.

For example, in the displaying, information indicating the second region or the third region may be displayed superimposed on any one of the images.

Accordingly, the position of the second region inside the image can be presented to the user, and thus the user can easily know the position of the second region.

For example, in the displaying, information indicating the second region or the third region may be displayed superimposed on a map of the target space.

Accordingly, the position of the second region in the environment can be presented to the user, and thus the user can easily know the position of the second region.

For example, the displaying may include displaying the second region and a reconstruction precision of each region included in the second region.

Accordingly, since the user can know the restoration precision of each region, in addition to the second region, the user can perform appropriate shooting based on this.

For example, the shooting method may further include presenting, to the user, an instruction for causing the user to shoot an image of the second region.

Accordingly, the user can efficiently perform appropriate shooting.

For example, the instruction may include at least one of a direction or a distance from a current position to the second region.

Accordingly, the user can efficiently perform appropriate shooting.

Furthermore, a shooting device according to an aspect of the present disclosure includes: a processor; and memory. Using the memory, the processor: shoots first images of a target space; generates first three-dimensional position information of the target space based on the first images and a first shooting position and a first shooting orientation of each of the first images; and determines a second region of the target space for which generating second three-dimensional position information using the first images is difficult, using the first three-dimensional position information and without generating the second three-dimensional position information, the second three-dimensional position information being more detailed than the first three-dimensional position information.

According to the shooting device, since the second region for which generating the second three-dimensional position information is difficult can be determined using the first three-dimensional position information without generating the second three-dimensional position information, the efficiency of shooting of images used for generating the second three-dimensional position information can be improved.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be described in detail with reference to the drawings. Note that each of the embodiments described below shows a specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims are described as optional structural components.

Embodiment 1

A three-dimensional map or the like can be more easily generated by generating a three-dimensional model using images shot by a camera than in a method of generating a three-dimensional model using laser measurement. Therefore, a method of generating a three-dimensional model using images is used when measuring distances in the constructive management at construction sites, for example. Here, the three-dimensional model is a representation of a shot measurement subject on a computer. The three-dimensional model has position information on three-dimensional parts of the measurement subject, for example.

However, when generating a three-dimensional model using images, a plurality of images of the same part having a parallax needs to be shot. Furthermore, the more the images, the denser the generated three-dimensional model can be. Furthermore, since the parallax has an influence on the precision of reproduction, the subject should be shot while appropriately moving when measuring distances. However, it is difficult to know an appropriate shooting position during shooting while coping with the status of the subject.

According to the present embodiment, a user interface (UI) or the like will be described which detects a region that is difficult to three-dimensionally reconstruct (generate a three-dimensional model) and issues an instruction as to the shooting position or orientation based on the detection result. Such an UI can reduce the possibility of failure or the decrease of precision of the three-dimensional model reconstruction. In addition, since the occurrence of re-shootings can be reduced, so that the efficiency of the operation can be improved.

First, a configuration of terminal device 100, which is an example of a shooting instruction device according to the present embodiment, will be described. FIG. 1 is a block diagram illustrating terminal device 100 according to the present embodiment. Terminal device 100 has a shooting function, a function of estimating a three-dimensional position and orientation during shooting, a function of determining a candidate for a next shooting position from a shot image, and a function of presenting, to a user, the estimated shooting position candidate. Terminal device 100 may also have a function of performing a three-dimensional reconstruction using an estimated three-dimensional position and orientation to generate a three-dimensional model, which is a three-dimensional point cloud of the shooting environment, a function of determining a candidate for a next shooing position using the three-dimensional model, a function of presenting, to the user, the estimated shooting position candidate, and a function of transmitting and receiving at least one of a shot video, a three-dimensional position and orientation, and a three-dimensional model to and from another terminal device, a management server or the like.

Terminal device 100 includes shooting unit 101, controller 102, position and orientation estimator 103, three-dimensional reconstructor 104, image analyzer 105, point cloud analyzer 106, communication unit 107, UI 108, video storage 111, camera orientation storage 112, and three-dimensional model storage 113.

Shooting unit 101 is a shooting device, such as a camera, and obtains a video (moving image). Although examples in which video is used will be mainly described below, a plurality of static images may be used instead of the video. Shooting unit 101 stores the obtained video in video storage 111. Shooting unit 101 may shoot a visible light image or an infrared image. When the infrared image is used, shooting is possible even in a dark environment, such as in the nighttime. Shooting unit 101 may be a monocular camera or may include a plurality of cameras such as in a stereo camera. By using a calibrated stereo camera, the precision of the three-dimensional position and orientation can be improved. Even if the stereo camera has not been calibrated, parallax images having a parallax can be obtained.

Controller 102 controls the whole of the shooting processing and the like of terminal device 100. Position and orientation estimator 103 estimates the three-dimensional position and orientation of the camera shooting the video using the video stored in video storage 111. Position and orientation estimator 103 also stores the estimated three-dimensional position and orientation in camera orientation storage 112. For example, position and orientation estimator 103 uses image processing, such as simultaneous localization and mapping (SLAM), to estimate the position and orientation of the camera. Alternatively, position and orientation estimator 103 may calculate the position and orientation of the camera using information obtained by various sensors (GPS or acceleration sensor) provided in terminal device 100. In the former case, the position and orientation can be estimated from information from shooting unit 101. In the latter case, the image processing can be achieved with low processing load.

Three-dimensional reconstructor 104 generates a three-dimensional model by performing three-dimensional reconstruction using the video stored in video storage 111 and the three-dimensional position and orientation stored in camera orientation storage 112. Three-dimensional reconstructor 104 stores the generated three-dimensional model in three-dimensional model storage 113. For example, three-dimensional reconstructor 104 performs the three-dimensional reconstruction using image processing, such as structure from motion (SfM). Alternatively, when using video obtained with a calibrated camera, such as a stereo camera, three-dimensional reconstructor 104 may use the stereo parallax. In the former case, a precise three-dimensional model can be generated by using many images. In the latter case, a three-dimensional model can be quickly generated with light processing load.

When SLAM is used by position and orientation estimator 103, a three-dimensional model of the environment is also generated at the same time as the three-dimensional position and orientation being estimated. This three-dimensional model can also be used.

Image analyzer 105 analyzes from what position the shooting should be performed and determines a shooting position candidate based on the analysis result, in order to perform precise three-dimensional reconstruction using the video stored in video storage 111 and the three-dimensional position and orientation stored in camera orientation storage 112. Information indicating the determined shooting position candidate is output to UI 108 and presented to the user.

Point cloud analyzer 106 determines the density or sparseness of a point cloud included in the three-dimensional model using the video stored in video storage 111, the three-dimensional position and orientation stored in camera orientation storage 112, and the three-dimensional model in three-dimensional model storage 113. Point cloud analyzer 106 determines a shooting position candidate at which a sparse region can be shot. Point cloud analyzer 106 also detects a point cloud region that is generated using a peripheral region of an image where lens distortion is likely to occur, and determines a shooting position candidate at which the region is located at the center of the field of view of the camera. The determined shooting position candidate is output to UI 108 and presented to the user.

Communication unit 107 transmits and receives the shot video and the calculated three-dimensional orientation and three-dimensional model to and from a cloud server or another terminal device via communication.

UI 108 presents, to the user, the shot video and the shooting position candidate determined by image analyzer 105 and point cloud analyzer 106. UI 108 also has an input function of receiving, from the user, input of a shooting start instruction, a shooting end instruction, and a priority processing part.

Figure 2:
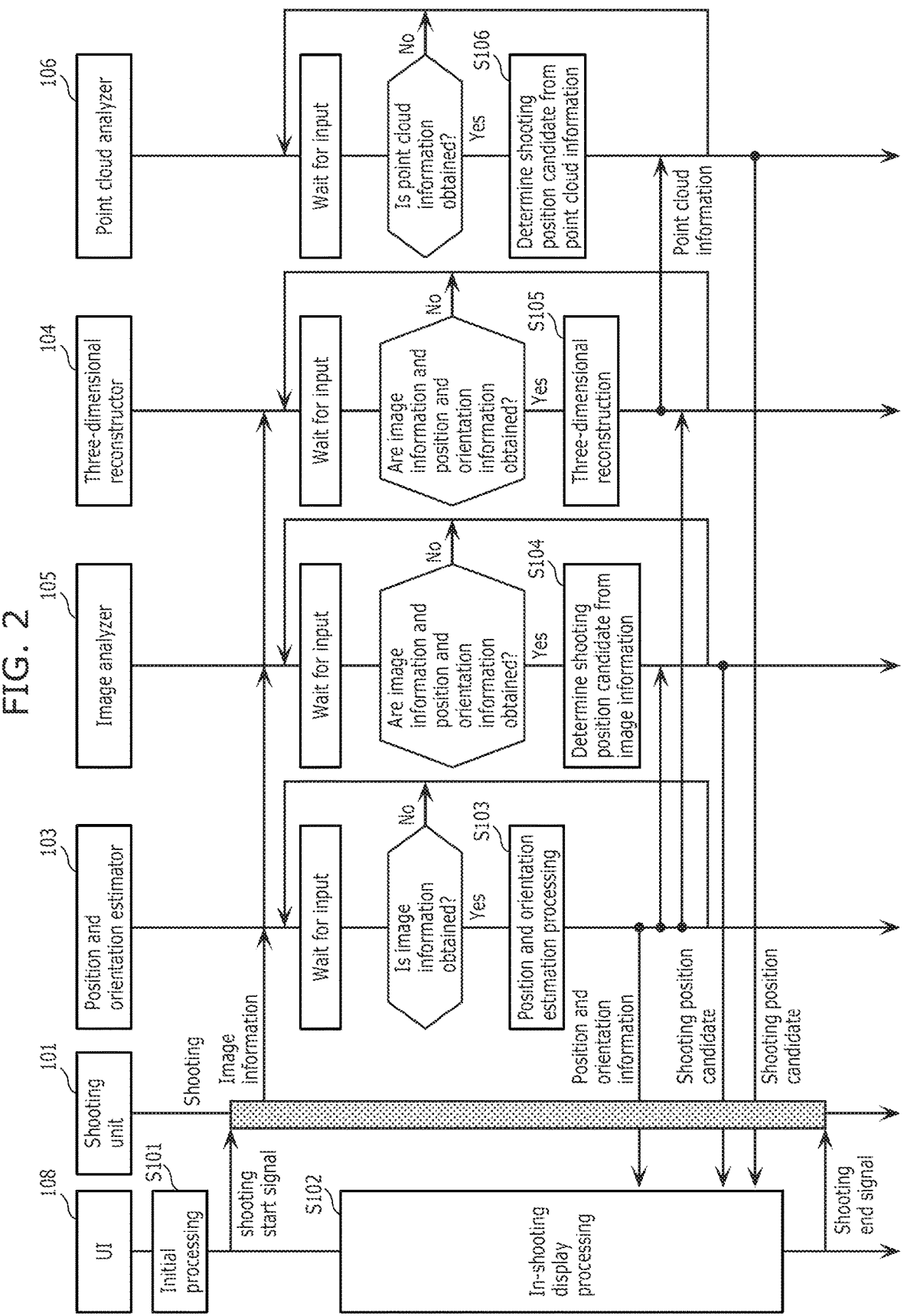
FIG. 2 is a sequence diagram of a terminal device according to Embodiment 1.

Next, an operation of terminal device 100 according to the present embodiment will be described. FIG. 2 is a sequence diagram illustrating exchanges of information and the like in terminal device 100. In FIG. 2, the hatched area shows that shooting unit 101 is continuing shooting. In order to generate a three-dimensional model of high quality, terminal device 100 analyzes a video and a shooting position and orientation in real time and issues a shooting instruction to the user. Here, analyzing in real time means performing analysis while shooting. Alternatively, analyzing in real time means performing analysis without generating a three-dimensional model. Specifically, terminal device 100 estimates the position and orientation of the camera during shooting, and determines, based on the estimation result and the shot video, a region that is difficult to reproduce. Terminal device 100 predicts a shooting position and orientation where a parallax that facilitates reproduction of the region is ensured, and presents the predicted shooting position and orientation on the UI. Although a sequence for moving image shooting is presented here, similar processing may be performed in shooting each single static image.

First, UI 108 performs initial processing (S101). By this, UI 108 transmits a shooting start signal to shooting unit 101. Start processing is performed by the user clicking a "shooting start" button on a display of terminal device 100, for example.

UI 108 then performs in-shooting display processing (S102). Specifically, UI 108 performs presentation of a video being shot and an instruction to the user.

Upon receiving the shooting start signal, shooting unit 101 performs shooting of a video, and transmits image information, which is the shot video, to position and orientation estimator 103, three-dimensional reconstructor 104, image analyzer 105, and point cloud analyzer 106. For example, shooting unit 101 may perform streaming transmission, in which a video is transmitted as appropriate during shooting, or may transmit a batch of video in a certain length of time. That is, the image information is one or more images (frames) included in a video. In the former case, the processing can be performed as appropriate, so that the waiting time for the three-dimensional model generation can be reduced. In the latter case, much shooting information can be used, so that the processing can be achieved with high precision.

Position and orientation estimator 103 first performs input waiting processing at the start of shooting to enter a state where position and orientation estimator 103 waits for image information from shooting unit 101. When image information is input from shooting unit 101, position and orientation estimator 103 performs position and orientation estimation processing (S103). That is, the position and orientation estimation processing is performed on a basis of one or more frames. When the position and orientation estimation processing has failed, position and orientation estimator 103 transmits an estimation failure signal to UI 108 to present the failure to the user. When the position and orientation estimation processing has succeeded, position and orientation estimator 103 transmits position and orientation information, which is the estimation result of the three-dimensional position and orientation, to UI 108 in order to output the current three-dimensional position and orientation. Position and orientation estimator 103 also transmits position and orientation information to image analyzer 105 and three-dimensional reconstructor 104.

Image analyzer 105 first performs input waiting processing at the start of shooting to enter a state where image analyzer 105 waits for image information from shooting unit 101 and position and orientation information from position and orientation estimator 103. When image information and position and orientation information are input, image analyzer 105 performs shooting position candidate determination processing (S104). The shooting position candidate determination processing may be performed for each frame or for a certain length of time (a plurality of frames) (such as every 5 seconds). Image analyzer 105 also determines whether terminal device 100 is moving toward the shooting position candidate generated by the shooting position candidate determination processing, and need not perform another shooting position candidate determination processing if terminal device 100 is moving toward the shooting position candidate. For example, image analyzer 105 determines that terminal device 100 is moving toward the shooting position candidate if the current position and orientation are on the line connecting the position and orientation in the image based on which the shooting position candidate was determined and the position and orientation of the calculated candidate.

Three-dimensional reconstructor 104 first performs input waiting processing at the start of shooting to enter a state where three-dimensional reconstructor 104 waits for image information from shooting unit 101 and position and orientation information from position and orientation estimator 103. When image information and position and orientation information are input, three-dimensional reconstructor 104 performs three-dimensional reconstruction processing (S105) to calculate a three-dimensional model. Three-dimensional reconstructor 104 transmits point cloud information, which is the calculated three-dimensional model, to point cloud analyzer 106.

Point cloud analyzer 106 first performs input waiting processing at the start of shooting to enter a state where point cloud analyzer 106 waits for point cloud information from three-dimensional reconstructor 104. When point cloud information is input, point cloud analyzer 106 performs shooting position candidate determination processing (S106). For example, point cloud analyzer 106 determines the state of density or sparseness of the whole point cloud, and detects a sparse region. Point cloud analyzer 106 determines a shooting position candidate at which much of the sparse region can be shot. Point cloud analyzer 106 may determine the shooting position candidate using not only point cloud information but also image information or position and orientation information.

Figure 3:
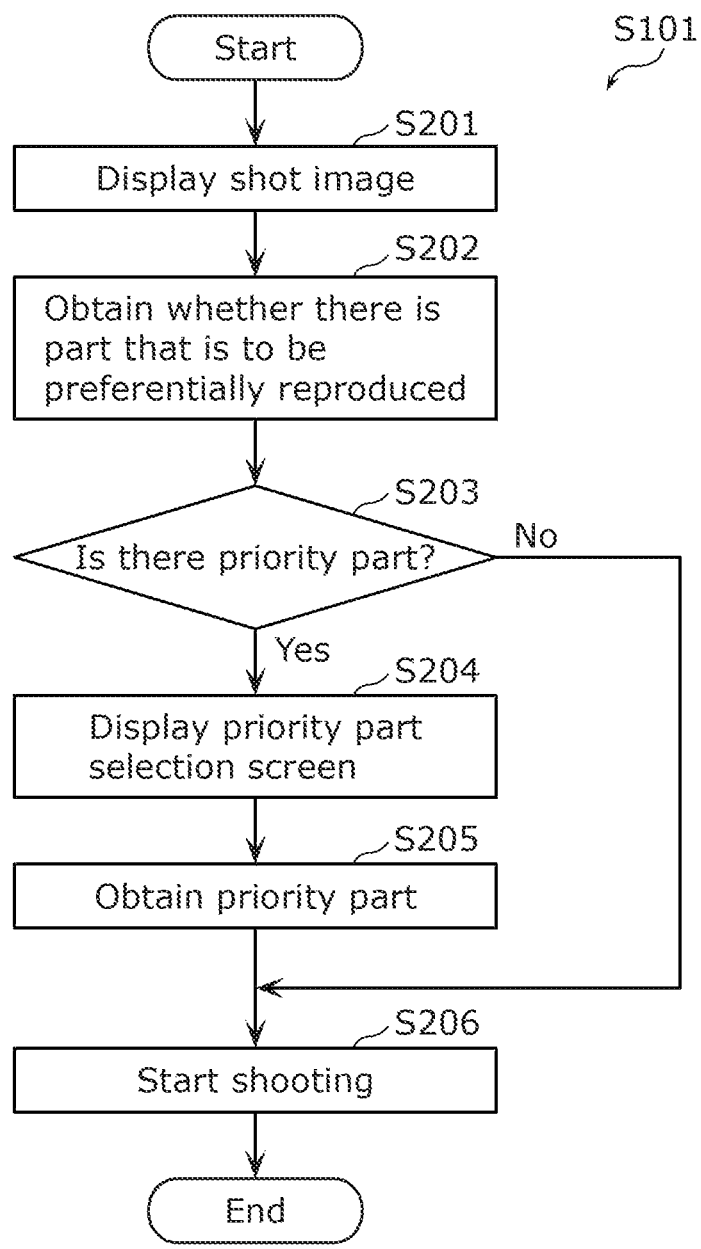
FIG. 3 is a flowchart of initial processing according to Embodiment 1.

Next, the initial processing (S101) will be described. FIG. 3 is a flowchart of the initial processing (S101). First, UI 108 displays a current shot image (S201). UI 108 then obtains whether there is a priority part, which is a part the user wants to preferentially reproduce (S202). For example, UI 108 displays a button that designates a priority mode, and determines that there is a priority part if the button is pressed.

When there is a priority part (Yes in S203), UI 108 displays a priority part selection screen (S204), and obtains information on a priority part selected by the user (S205). After step S205, or when there is no priority part (No in S203), UI 108 then outputs a shooting start signal to shooting unit 101. In this way, shooting is started (S206). For example, shooting may be started by the user pressing a button or may be automatically started when a predetermined time has elapsed.

Here, for the set priority part, the degree of priority of reproduction is set to be higher when issuing an instruction to move the camera or the like. As a result, no instruction is issued to move the camera to reproduce a region that is difficult to reproduce and is not required by the user, and an instruction as to a region required by the user can be issued.

Figure 4:
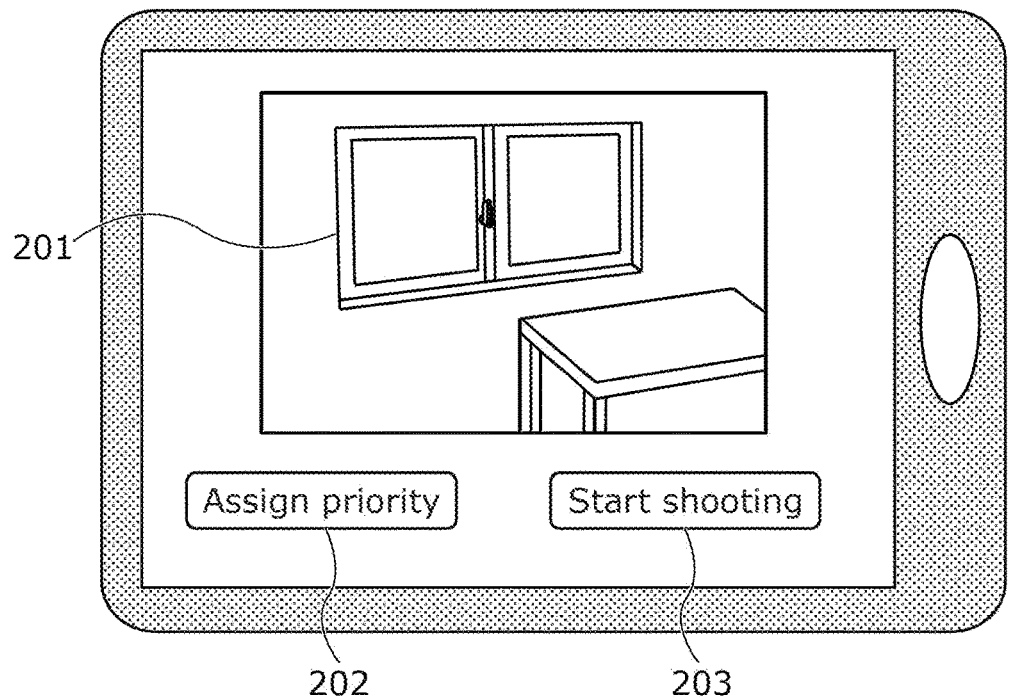
FIG. 4 is a diagram illustrating an example of an initial display according to Embodiment 1.

FIG. 4 is a diagram illustrating an example of an initial display in the initial processing (S101). Shot image 201, priority assignment button 202 for selecting whether to select a priority-assigned part, and shooting start button 203 for starting shooting are displayed. Shot image 201 may be a static image or a video (moving image) currently being shot.

Figure 5:
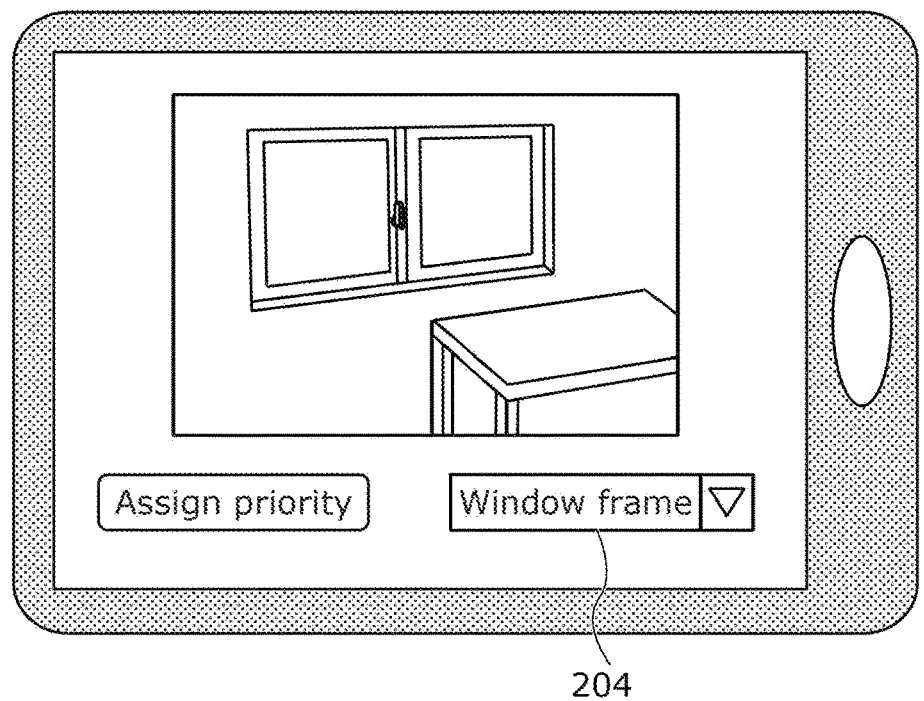
FIG. 5 is a diagram illustrating an example of a way of selecting a priority-assigned part according to Embodiment 1.

FIG. 5 is a diagram illustrating an example of the way of selecting a priority-assigned part when assigning a priority. In this drawing, attribute recognition is performed for a target object, such as a window frame, and a desired target object is selected, in selection field 204, from a list of target objects included in the image. For example, a label, such as window frame, desk, or wall, is assigned to each pixel in the image in an approach, such as semantic segmentation, and a batch of target pixels is selected by selecting a label.

Figure 6:
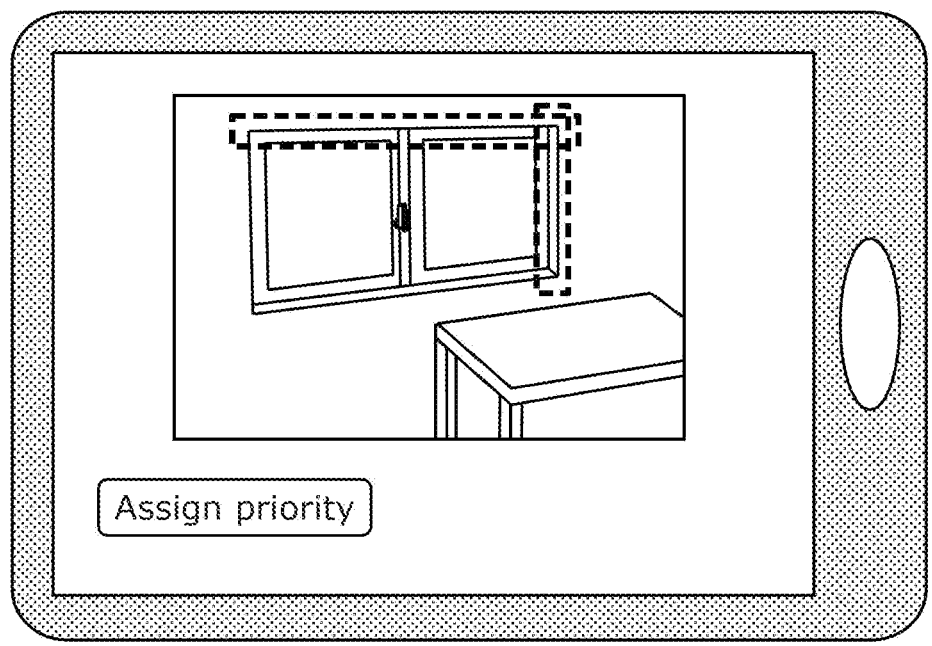
FIG. 6 is a diagram illustrating an example of a way of selecting a priority-assigned part according to Embodiment 1.

FIG. 6 is a diagram illustrating another example of the way of selecting a priority-assigned part when assigning a priority. In this drawing, a priority part is selected by specifying an arbitrary region (a region surrounded by a rectangle in the drawing) by means of a pointer or through a touch operation. Any means can be used as far as the user can select a particular region. For example, the selection may be made by specifying a color or by rough specification, such as a right half region of the image.

Other ways of input than the operations on the screen can also be used. For example, the selection may be made through audio input. In that case, the input operation can be readily performed even by a user who is wearing gloves in cold weather and can hardly input by hand.

Although an example has been shown here in which a priority part is selected in the initial processing before shooting, a priority part may be added as required during shooting. Therefore, a part that is not in the image at the time of the initial processing can be selected.

Figure 7:
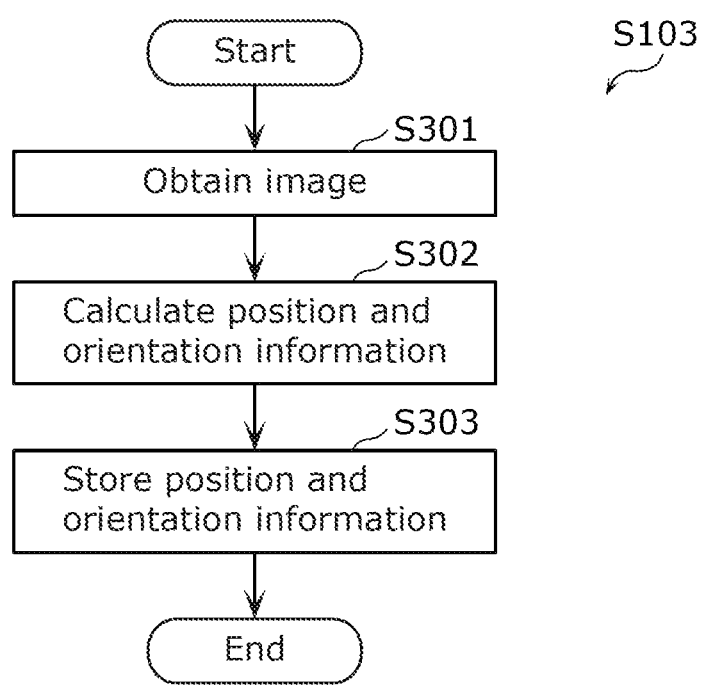
FIG. 7 is a flowchart of position and orientation estimation processing according to Embodiment 1.

Next, the position and orientation estimation processing (S103) will be described. FIG. 7 is a flowchart of the position and orientation estimation processing (103). First, position and orientation estimator 103 obtains one or more images or videos from video storage 111 (S301). Position and orientation estimator 103 then calculates or obtains, for an input image, position and orientation information including a camera parameter including the three-dimensional position and orientation (direction) of the camera, lens information and the like (S302). For example, position and orientation estimator 103 calculates position and orientation information by performing image processing, such as SLAM or SfM, on an image obtained in S301.

Position and orientation estimator 103 then stores the position and orientation information obtained in S302 in camera orientation storage 112 (S303).

The image input in S301 is an image sequence for a predetermined length of time that is formed by a plurality of frames, and the process of S302 and the following steps may be performed on the image sequence (a plurality of images). Alternatively, images may be successively input in streaming or the like, and the process of S302 and the following steps may be repeatedly performed on each image. In the former case, information at different points in time is used, and the precision can be improved. In the latter case, since images are successively input, a fixed length of input delay can be ensured, and the waiting time of the three-dimensional model generation can be reduced.

Figure 8:
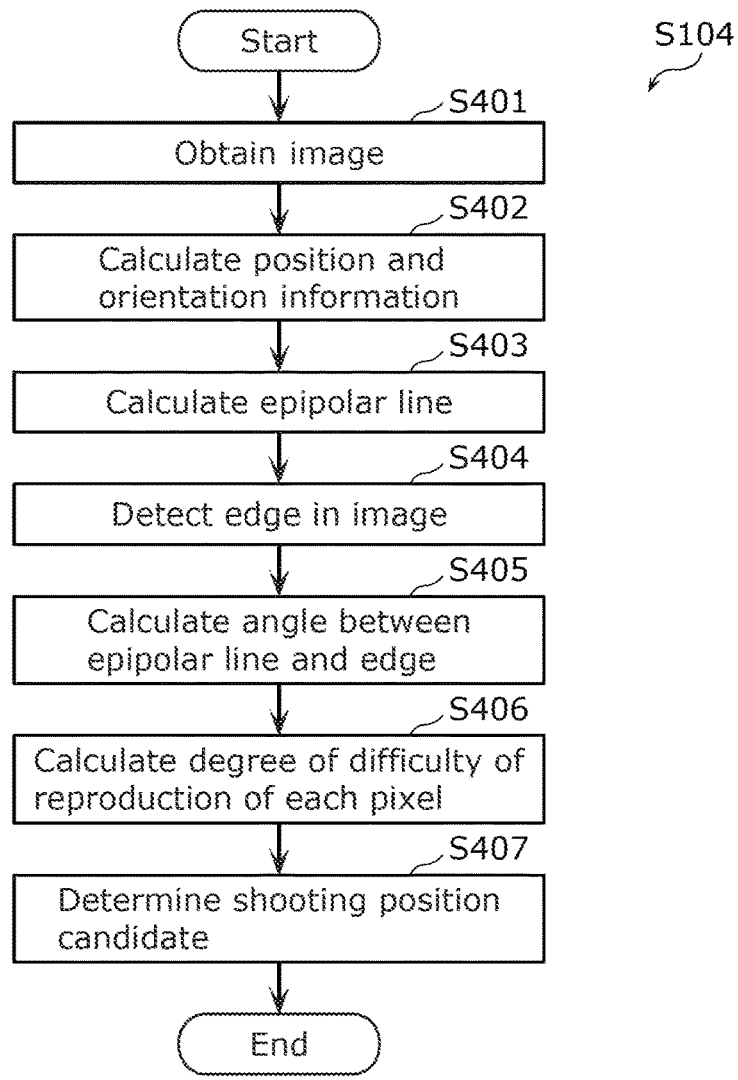
FIG. 8 is a flowchart of shooting position candidate determination processing according to Embodiment 1.

Next, the shooting position candidate determination processing (S104) by image analyzer 105 will be described. FIG. 8 is a flowchart of the shooting position candidate determination processing (S104). First, image analyzer 105 obtains images or videos from video storage 111 (S401). One of the obtained images is set as a key image. Here, the key image is an image that serves as a reference in the subsequent three-dimensional reconstruction. For example, the depth for each pixel of the key image is estimated using information on the other images than the key image, and the three-dimensional reconstruction is performed using the estimated depths. Image analyzer 105 then obtains position and orientation information on each of the images (S402).

Image analyzer 105 then uses the position and orientation information on each image to calculate an epipolar line between images (between cameras) (S403). Image analyzer 105 then detects an edge in each image (S404). For example, image analyzer 105 detects an edge through filtering processing, such as the Sobel filter.

Image analyzer 105 then calculates an angle between the epipolar line and the edge in each image (S405). Image analyzer 105 then calculates the degree of difficulty of reproduction of each pixel in the key image based on the angle obtained in S405 (S406). Specifically, the closer to parallel the epipolar line and the edge, the more difficult the three-dimensional reconstruction becomes, so that the degree of difficulty of reproduction is set to be higher as the angle becomes smaller. The degree of difficulty of reproduction may be set in two steps, such as high and low, or in more steps. For example, the degree of difficulty of reproduction may be set to be high when the angle is smaller than a predetermined value (such as 5 degrees) and to be low when the angle is greater than the predetermined value.

Image analyzer 105 then estimates, based on the degree of difficulty of reproduction calculated in S406, a shooting position where a region of a high degree of difficulty of reproduction is easily reproduced, and determines the estimated position as a shooting position candidate (S407). Specifically, a region of a high degree of difficulty of reproduction means that the region is on the plane including the direction of displacement of the cameras, and the epipolar line and the edge come out of parallelism as the camera moves in a direction perpendicular to the plane. Therefore, when the camera is moving forward, the degree of difficulty of reproduction of the region of high degree of difficulty of reproduction can be reduced by moving the camera in the up-down direction or the left-right direction.

Although the degree of difficulty of reproduction is described as being determined through the process from S401 to S406, the present disclosure is not limited to this as far as the degree of difficulty of reproduction can be calculated. For example, the degradation of image quality due to lens distortion is more significant at the edges of the image than at the center of the image. Therefore, image analyzer 105 may determine an object that is captured only at an edge of each image, and set the degree of difficulty of reproduction of the region of the object to be high. For example, image analyzer 105 may determine the fields of view of the cameras in the three-dimensional space from the position and orientation information, and determine a region that is captured only at an edge of the screen based on the overlap of the fields of view of the cameras.

Figure 9:
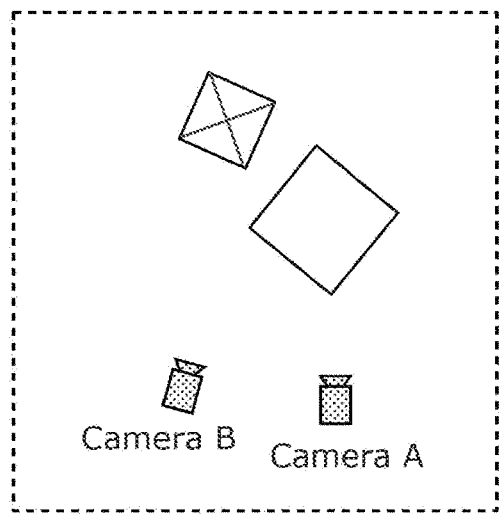
FIG. 9 is a diagram illustrating cameras and objects viewed from above according to Embodiment 1.
Figure 10:
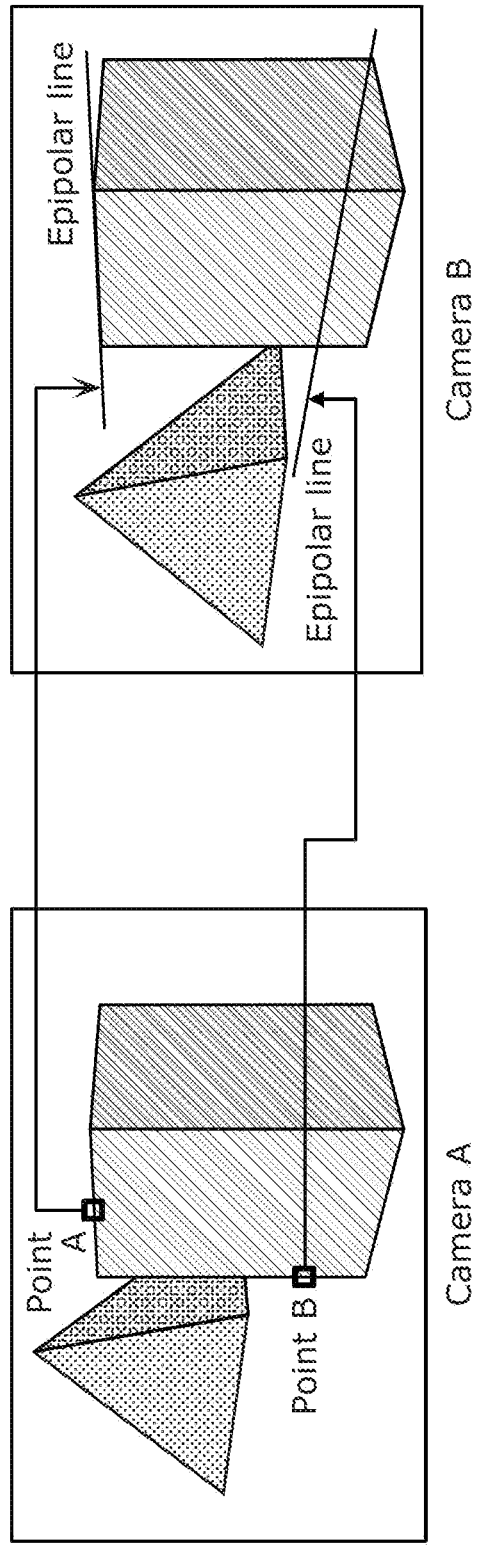
FIG. 10 is a diagram illustrating an example of an image obtained by each camera according to Embodiment 1.

In the following, that the difficulty of reproduction varies with the angle between the epipolar line and the edge will be described. FIG. 9 is a diagram illustrating cameras and objects viewed from above. FIG. 10 is a diagram illustrating an example of an image obtained by each camera in the situation shown in FIG. 9.

In this case, when searching an image from camera B for a corresponding point to a point in an image from camera A, an epipolar line that can be calculated from the camera geometry is searched. For point A, for which the epipolar line and the edge of the object in the image are parallel to each other, matching using pixel information, such as normalized cross correlation (NCC), is difficult, and it is difficult to determine a correct corresponding point.

On the other hand, for point B, for which the epipolar line and the edge of the object in the image are perpendicular to each other, matching is easy, and a correct corresponding point can be determined. That is, by calculating the angle between the epipolar line and the edge in the image, the degree of difficulty of determination of a corresponding point can be determined. Whether a correct corresponding point can be determined depends on the precision of the three-dimensional reconstruction. Therefore, the angle between the epipolar line and the edge in the image can be used as the degree of difficulty of the three-dimensional reconstruction. Any information equivalent to angle can be used. For example, the epipolar line and the edge may be regarded as vectors, and the inner product of the epipolar line and the edge may be used.

The epipolar line can be calculated using a fundamental matrix between camera A and camera B. The fundamental matrix can be calculated from the position and orientation information on camera A and camera B. Provided that intrinsic matrices of camera A and camera B are KA and KB, a relative rotation matrix of camera B viewed from camera A is R, and a relative movement vector is T, the epipolar line can be determined in the manner described below.

For a pixel (x, y) on camera A, (a, b, c) are calculated according to the following formula, and the epipolar line on camera B can be represented as a straight line that satisfies a relation: ax+by+c=0.

$$F = K_B^{-T} * ([t_X] * R) * K_A^{-1} \quad \text{[Math. 1]}$$

$$[t_X] = \begin{pmatrix} 0 & -T_z & T_Y \\ T_Z & 0 & -T_X \\ -T_Y & T_X & 0 \end{pmatrix}$$

$$\begin{pmatrix} a \\ b \\ c \end{pmatrix} = F \begin{pmatrix} x \\ y \\ 1 \end{pmatrix}$$

Figure 11:
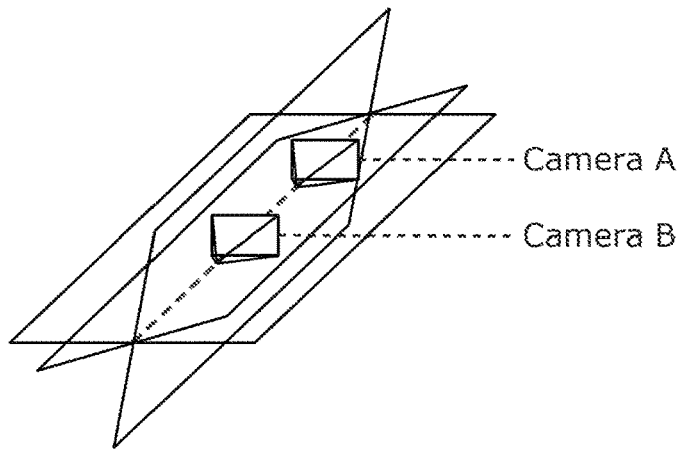
FIG. 11 is a schematic diagram for describing an example of shooting position candidate determination according to Embodiment 1.
Figure 12:
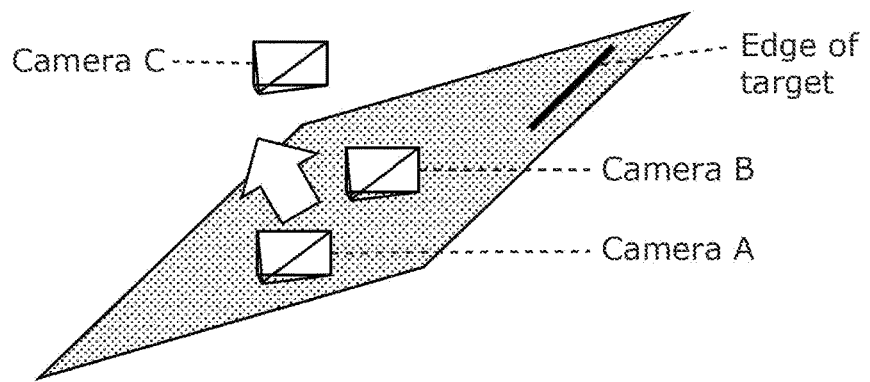
FIG. 12 is a schematic diagram for describing an example of shooting position candidate determination according to Embodiment 1.
Figure 13:
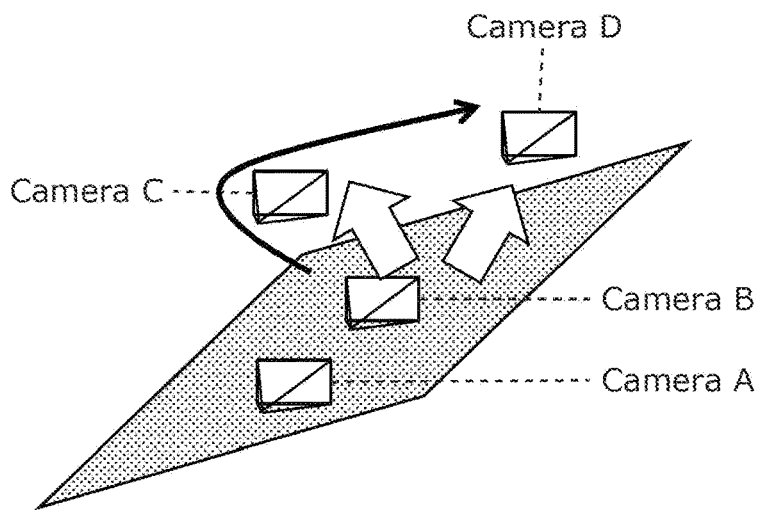
FIG. 13 is a schematic diagram for describing an example of shooting position candidate determination according to Embodiment 1.

In the following, examples of the shooting position candidate determination will be described. FIG. 11 to FIG. 13 are schematic diagrams for describing examples of the shooting position candidate determination. As illustrated in FIG. 11, edges of high degree of difficulty of reproduction are often a straight line or line segment on a plane in the three-dimensional space that passes through a straight line connecting the three-dimensional positions of camera A and camera B. Conversely, for a straight line perpendicular to a plane passing through such a straight line, the angle between the epipolar line and the edge is greater in the matching between camera A and camera B, and the degree of difficulty of reproduction is lower.

That is, when determining a shooting position candidate, if shooting is performed at a position of camera C displaced from the target edge perpendicularly to the plane that includes the edge and satisfies the above condition as shown in FIG. 12, the degree of difficulty of reproduction for the target edge can be reduced in the matching between camera C and camera A or B. Therefore, image analyzer 105 determines camera C as the shooting position candidate.

When there is no target edge, image analyzer 105 may determines a shooting position candidate in the manner described above by designating the edge of the highest degree of difficulty of reproduction as a candidate. Alternatively, image analyzer 105 may randomly select an edge from ten edges of the highest degrees of difficulty of reproduction.

Although camera C is described here as being calculated from only the information on the pair of cameras (camera A and camera B), when there is a plurality of edges of high degree of difficulty of reproduction, image analyzer 105 may determine a shooting position candidate (camera C) for a first edge and a shooting position candidate (camera D) for a second edge, and output a route connecting camera C and camera D as shown in FIG. 13.

The way of shooting position candidate determination is not limited to this. Considering that the influence of a distortion or the like on the image quality is smaller in a region closer to the center of the image, when an edge captured at an edge of the image from camera A is designated as a target, image analyzer 105 may determine, as a shooting position candidate, a position where the edge is captured at the center of the image.

Figure 14:
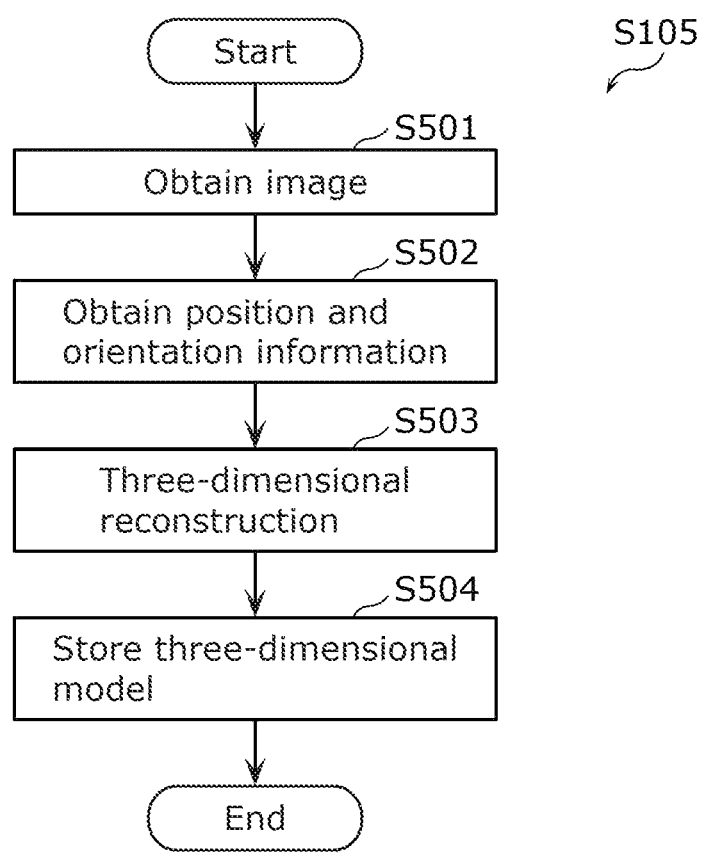
FIG. 14 is a flowchart of a three-dimensional reconstruction processing according to Embodiment 1.

Next, the three-dimensional reconstruction processing (S105) will be described. FIG. 14 is a flowchart of the three-dimensional reconstruction processing (S105). First, three-dimensional reconstructor 104 obtains a plurality of images or videos from video storage 111 (S501). Three-dimensional reconstructor 104 then obtains position and orientation information (camera parameter) on each of the images from camera orientation storage 112 (S502).

Three-dimensional reconstructor 104 then performs three-dimensional reconstruction using the obtained images and the obtained position and orientation information to generate a three-dimensional model (S503). For example, three-dimensional reconstructor 104 performs the three-dimensional reconstruction using the silhouette volume intersection or SfM. Finally, three-dimensional reconstructor 104 stores the generated three-dimensional model in three-dimensional model storage 113 (S504).

The processing of S503 need not be performed by terminal device 100. For example, terminal device 100 transmits the images and camera parameters to a cloud server or the like. The cloud server performs three-dimensional reconstruction to generate a three-dimensional model. Terminal device 100 receives the three-dimensional model from the cloud server. In this way, terminal device 100 can use a three-dimensional model of high quality, regardless of the capability of terminal device 100.

Figure 15:
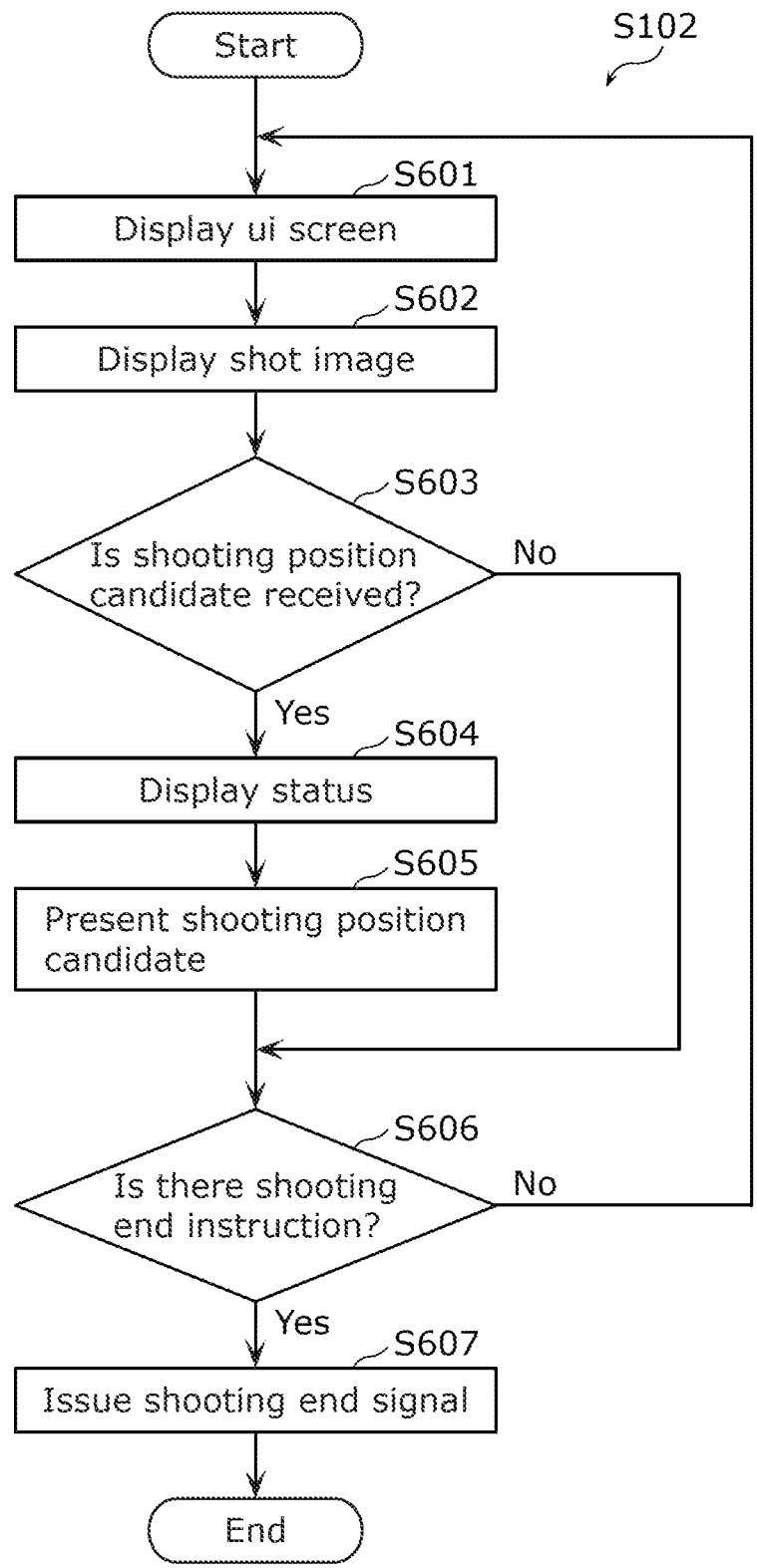
FIG. 15 is a flowchart of in-shooting display processing according to Embodiment 1.

Next, the in-shooting display processing (S102) will be described. FIG. 15 is a flowchart of the in-shooting display processing (102). First, UI 108 displays a UI screen (S601). UI 108 then obtains and displays a shot image, which is an image being shot (S602). UI 108 then determines whether a shooting position candidate or estimation failure signal has been received (S603). Here, the estimation failure signal is a signal that is issued by position and orientation estimator 103 when the position and orientation estimation by position and orientation estimator 103 fails. The shooting position candidate is transmitted from three-dimensional reconstructor 104 or point cloud analyzer 106.

When a shooting position candidate is received (Yes in S603), UI 108 displays that there is a shooting position candidate (S604), and presents the shooting position candidate (S605). For example, UI 108 may visually display the shooting position candidate via the UI or may present the shooting position candidate by audio from a mechanism that outputs audio, such as a speaker. Specifically, an audio instruction "raise the terminal device 20 cm" may be issued in order to move terminal device 100 upward, or an audio instruction "turn the terminal device 45° to the right" in order to shoot an area to the right. In that case, the user need not look at the screen of terminal device 100 when shooting while moving, and therefore can safely perform shooting.

When terminal device 100 is provided with an oscillator, such as a vibrator, the presentation may be made by vibration. For example, rules may be previously established, such as that two short series of vibrations indicate to move the terminal device upward and one long series of vibrations indicates to turn the terminal device to the right, and the presentation may be made according to the rules. In that case, again, the user need not look at the screen and therefore can safely perform shooting.

When receiving the estimation failure signal, UI 108 displays that the estimation has failed in S604.

After S605, or when no shooting position candidate has been received (No in S603), UI 108 then determines whether there is a shooting end instruction (S606). The shooting end instruction may be an operation on the UI screen or may be audio. Alternatively, the shooting end instruction may be a gesture input, such as shaking terminal device 100 twice.

When there is a shooting end instruction (Yes in S606), UI 108 issues a shooting end signal that makes shooting unit 101 to end shooting (S607). When there is no shooting end instruction (No in S606), UI 108 performs S601 and the following steps again.

Figure 16:
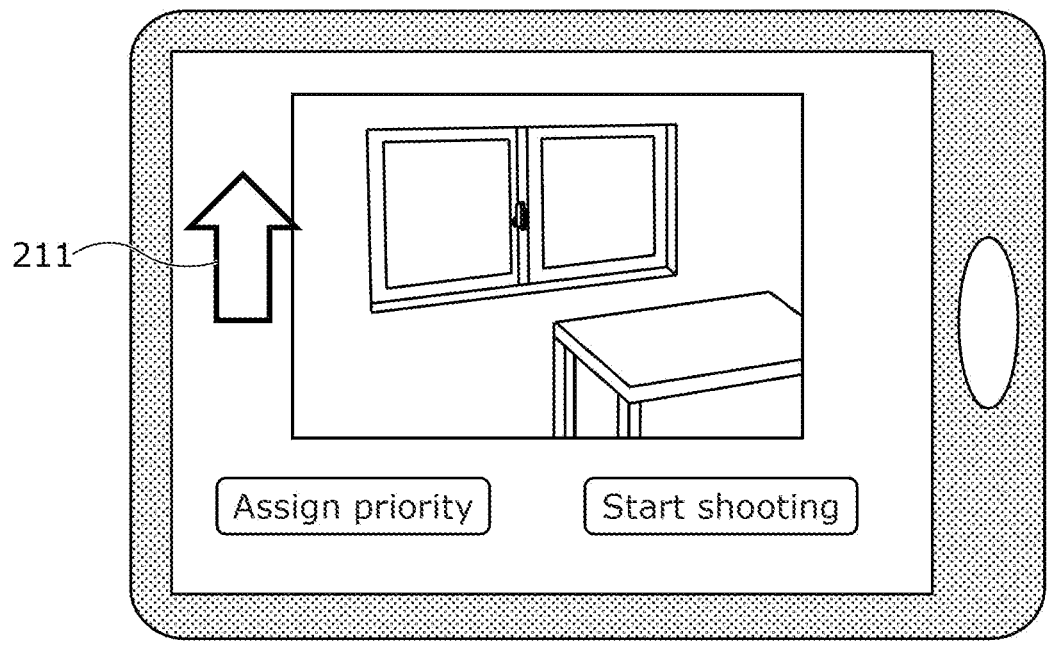
FIG. 16 is a diagram illustrating an example of a way of visually presenting a shooting position candidate according to Embodiment 1.

FIG. 16 is a diagram illustrating an example of the way of visually presenting a shooting position candidate. An example is shown here in which the shooting position candidate is above the current position, and an instruction is issued to shoot from a position above the current position. In this example, up arrow 211 is presented on the screen. UI 108 may change the way of display (such as color or size) of the arrow depending on the distance from the current position to the shooting position candidate. For example, UI 108 may display a large red arrow when the current position is distant from the shooting position candidate, and change the arrow into a small green arrow as the current position comes closer to the shooting position candidate. When there is no shooting position candidate (that is, there is no region of high degree of difficulty of reproduction in the current shooting), UI 108 need not display an arrow or may present a circle symbol to indicate that the current shooting is going well.

Figure 17:
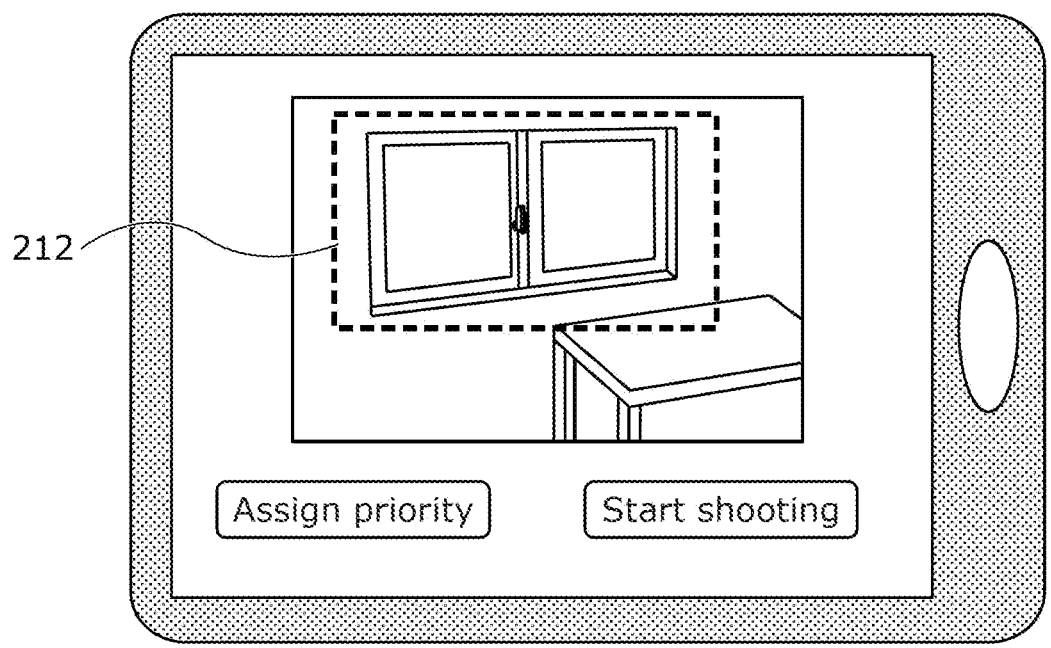
FIG. 17 is a diagram illustrating an example of a way of visually presenting a shooting position candidate according to Embodiment 1.

FIG. 17 is a diagram illustrating another example of the way of visually presenting a shooting position candidate. Here, UI 108 displays dotted frame 212 that is located at the center of the screen when the camera has moved to the shooting position candidate, and instructs the user to move the camera so as to bring dotted frame 212 closer to the center of the screen. The distance between the current position and the shooting position candidate may be indicated by the color or thickness of the frame.

Figure 18:
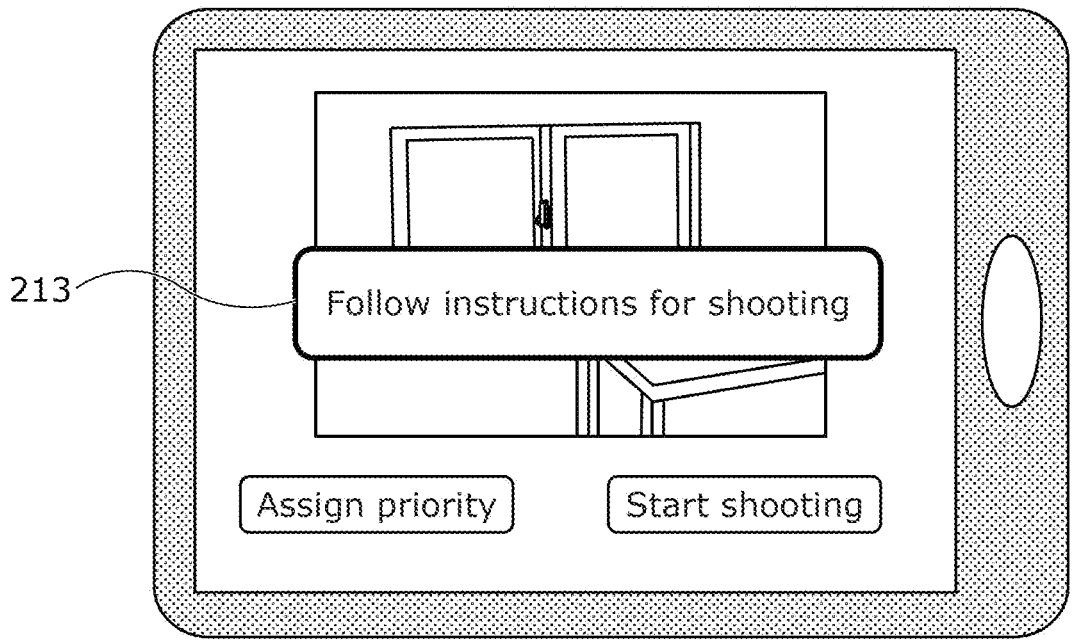
FIG. 18 is a diagram illustrating an example display of an alert according to Embodiment 1.

When the user fails to follow the instruction to bring the camera closer to the presented shooting position candidate, UI 108 may display message 213, such as an alert, as illustrated in FIG. 18. UI 108 may also switch the way of instruction depending on the situation. For example, UI 108 may display the instruction with a small size immediately after starting the instruction, and enlarge the displayed instruction once a predetermined time has elapsed. Alternatively, UI 108 may issue an alert based on the time elapsed since the start of the instruction. For example, UI 108 may issue an alert if the instruction is not followed when one minute has elapsed since the start of the instruction.

UI 108 may present rough information when the current position is distant from the shooting position candidate, and display the frame when the current position has come close to the shooting position candidate enough that the shooting position candidate can be shown in the screen.

Other ways of displaying a shooting position candidate than those illustrated can also be used. For example, UI 108 may display a shooting position candidate on (two-dimensional or three-dimensional) map information. In that case, the user can intuitively know the direction in which the user should move.

Although examples have been described here in which instructions are issued to the user, instructions may be issued to a moving body provided with a camera, such as a robot or a drone. In that case, the functionality of terminal device 100 may be included in the moving body. That is, the moving body may move to the shooting position candidate and shoot. In that case, a precise three-dimensional model can be stably generated by automatically controlled equipment.

Information on a pixel determined to be high in degree of difficulty of reproduction may be used for three-dimensional reconstruction by terminal device 100 or a server. For example, terminal device 100 or a server may determine a three-dimensional point reconstructed using a pixel determined to be high in degree of difficulty of reproduction as a region or point of low precision. Furthermore, metadata representing the region or point of low precision may be imparted to the three-dimensional model or three-dimensional point. In that case, whether precision of the generated three-dimensional point is high or low can be determined in the subsequent processing. For example, the extent of correction in the filtering processing for three-dimensional points can be changed depending on the precision.

Figure 19:
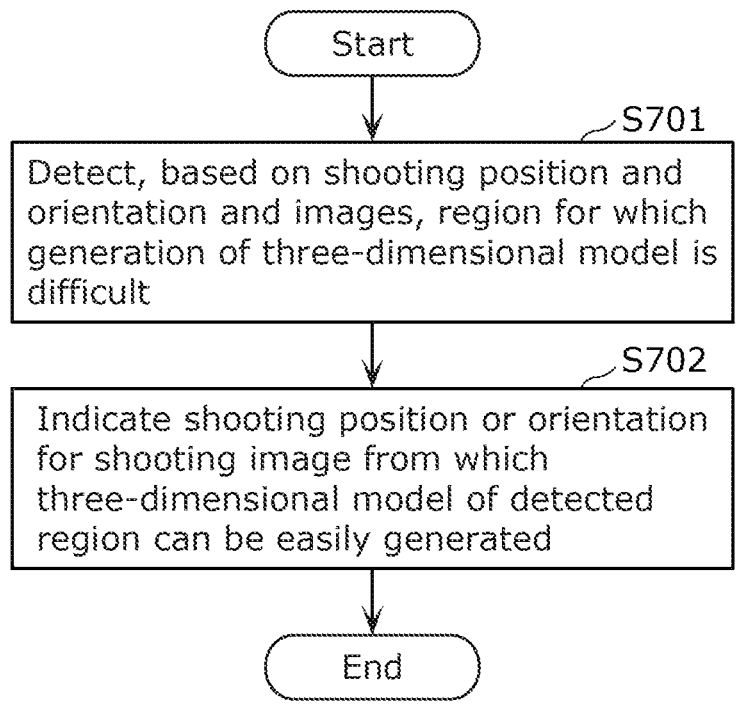
FIG. 19 is a flowchart of shooting instruction processing according to Embodiment 1.

As described above, the shooting instruction device according to the present embodiment performs the processes shown in FIG. 19. The shooting instruction device (for example, terminal device 100) detects, based on images generated by shooting a subject and a shooting position and a shooting orientation of each of the images, a region (second region) for which generating of a three-dimensional model of the subject using the images is difficult (S701). Next, the shooting instruction device instructs at least one of a shooting position or a shooting orientation so that an image which facilitates generating of a three-dimensional model of the region detected is shot (S702). Accordingly, the precision of the three-dimensional model can be improved.

Here, the image which facilitates generating of a three-dimensional model includes at least one of (1) an image of any region that is not shot from some of a plurality of shooting viewpoints, (2) an image of a region having small amount of blurring, (3) an image of a region that includes many feature points because of its higher contrast than the other regions, (4) an image of a region that is closer to a shooting viewpoint than the other regions and has a smaller error between the actual position and a calculated three-dimensional position, and (5) an image of a region that is less affected by a lens distortion than the other regions.

For example, the shooting instruction device further gets input to specify a priority region (first region), and, in the instructing (S702), the at least one the shooting position or the imaging orientation is instructed so that an image which facilitates generating of a three-dimensional model of the priority region specified is shot. Accordingly, the precision of the three-dimensional model of the region required by the user can be preferentially improved.

For example, the shooting instruction device: gets input to specify a first region (for example, a priority region) in order to generate a three-dimensional model of a subject, based on images generated by shooting the subject and on a shooting position and a shooting orientation of each of the images (S205 in FIG. 3); and instructs at least one of a shooting position or a shooting orientation so that an image to be used in generating a three-dimensional model of the first region specified is shot. Accordingly, since the precision of the three-dimensional model of the region required by the user can be preferentially improved, the precision of the three-dimensional model can be improved.

For example, the shooting instruction device further: detects a second region for which generating of the three-dimensional model is difficult, based on the images, the shooting positions, and the shooting orientations (S701); and instructs at least one of a shooting position or a shooting orientation so that an image which facilitates generating of a three-dimensional model of the second region is generated (S702). In the instructing corresponding to the first region (S702), the at least one of the shooting position or the shooting orientation is instructed so that the image which facilitates the generating of the three-dimensional model of the first region is shot.

For example, as shown in FIG. 5, and so on, the shooting instruction device displays an image of the subject on which recognition of an attribute has been performed, and, in the getting of input to specify the first region, gets input of the attribute.

For example, the detecting of the second region includes: (i) calculating an edge, on a two-dimensional image, for which an angular difference with an epipolar line based on the shooting position and the shooting orientation is smaller than a predetermined value; and (ii) detecting, as the second region, a three-dimensional region corresponding to the edge calculated. In the instructing corresponding to the second region, the shooting instruction device instructs the at least one of the shooting position or the shooting orientation so that an image for which the angular difference is bigger than the predetermined value is shot.

For example, the images are frames included in a moving image that is currently being shot and displayed, and, the instructing corresponding to the second region (S702) is performed in real time. Accordingly, shooting instruction can be performed in real time, and thus user convenience can be improved.

For example, in the instructing corresponding to the second region (S702), a shooting direction is instructed, as shown in FIG. 16, for example. Accordingly, the user can easily perform appropriate shooting following the instruction. For example, the direction in which the next shooting position is located with respect to the current position is presented.

For example, in the instructing corresponding to the second region (S702), a shooting region is instructed, as shown in FIG. 17, for example. Accordingly, the user can easily perform ideal shooting following the instruction.

For example, the shooting instruction device includes a processor and memory, and using the memory, the processor performs the above-described processes.

Embodiment 2

A three-dimensional map or the like can be more easily generated by generating a three-dimensional model using images shot by a camera than in a method of generating a three-dimensional model using laser measurement. Here, the three-dimensional model is a representation of a shot measurement subject on a computer. The three-dimensional model has position information on three-dimensional parts of the measurement subject, for example.

However, it is not easy to determine an image that is required by the user (the person who is shooting the image) when shooting images used for generating a three-dimensional model of a target space to be measured (referred to as a target space, hereinafter). Therefore, there is a possibility that no appropriate image is obtained, and as a result, no three-dimensional model can be reconstructed, or the precision of the three-dimensional model may decrease. Here, the precision means the error between position information of the three-dimensional model and the actual position. In the present embodiment, information for assisting the user to shoot is presented during shooting. This allows the user to efficiently shoot an appropriate image. In addition, the precision of the three-dimensional model generated can be improved.

According to the present embodiment, specifically, a region that has not been shot is detected during shooting of a target space, and the detected region is presented to the user (the person who is shooting the image). Here, the region that has not been shot may include a region that has not been shot at that point in time in the shooting of the target space (such as a region hidden by another object) and a region that has been shot but has not resulted in any three-dimensional point. In addition, a region that is difficult to three-dimensionally reconstruct (generate a three-dimensional model) is detected, and the detected region is presented to the user. In this way, the efficiency of shooting can be improved, and the possibility of failure or the decrease of precision of the three-dimensional model reconstruction can be reduced.

Figure 20:
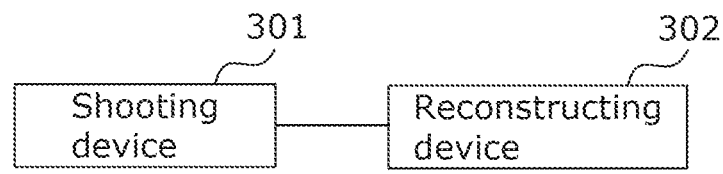
FIG. 20 is a diagram illustrating a configuration of a three-dimensional reconstruction system according to according to Embodiment 2.

First an example configuration of a three-dimensional reconstruction system according to the present embodiment will be described. FIG. 20 is a diagram illustrating a configuration of the three-dimensional reconstruction system according to the present embodiment. As illustrated in FIG. 20, the three-dimensional reconstruction system includes shooting device 301 and reconstructing device 302.

Shooting device 301 is a terminal device used by the user and, for example, is a mobile terminal, such as a tablet terminal, a smartphone, or a notebook computer. Shooting device 301 has a shooting function, a function of estimating the position and orientation (referred to as a position/orientation, hereinafter) of a camera, and a function of displaying a shot region, for example. Furthermore, shooting device 301 transmits a shot image and a position/orientation to reconstructing device 302 during or after shooting. Here, the image is a moving image, for example. The image may be a plurality of static images. Shooting device 301 estimates a position/orientation during shooting, determines a shot region using at least one of the position/orientation and a three-dimensional point cloud, and presents the shot region to the user.

Reconstructing device 302 is a server connected to shooting device 301 via a network or the like, for example.

Reconstructing device 302 obtains an image shot by shooting device 301, and generates a three-dimensional model using the obtained image. For example, reconstructing device 302 may use the camera position/orientation estimated by shooting device 301 or estimate the camera position from the obtained image.

Data exchange between shooting device 301 and reconstructing device 302 may occur offline via a hard disk drive (HDD) or may constantly occur over a network.

The three-dimensional model generated by reconstructing device 302 may be a dense three-dimensional point cloud of a three-dimensional space or a set of three-dimensional meshes. The three-dimensional point cloud generated by shooting device 301 is a sparse set of three-dimensional points formed by three-dimensionally reproducing feature points, such as a corner of an object in the space. That is, the three-dimensional model (three-dimensional point cloud) generated by shooting device 301 is a model having a lower spatial resolution than the three-dimensional model generated by reconstructing device 302. In other words, the three-dimensional model (three-dimensional point cloud) generated by shooting device 301 is a simpler model than the three-dimensional model generated by reconstructing device 302. The simpler model is a model having less amount of information, a model that is more easily generated, or a model having lower precision. For example, the three-dimensional model generated by shooting device 301 is a sparser three-dimensional point cloud than the three-dimensional model generated by reconstructing device 302.

Figure 21:
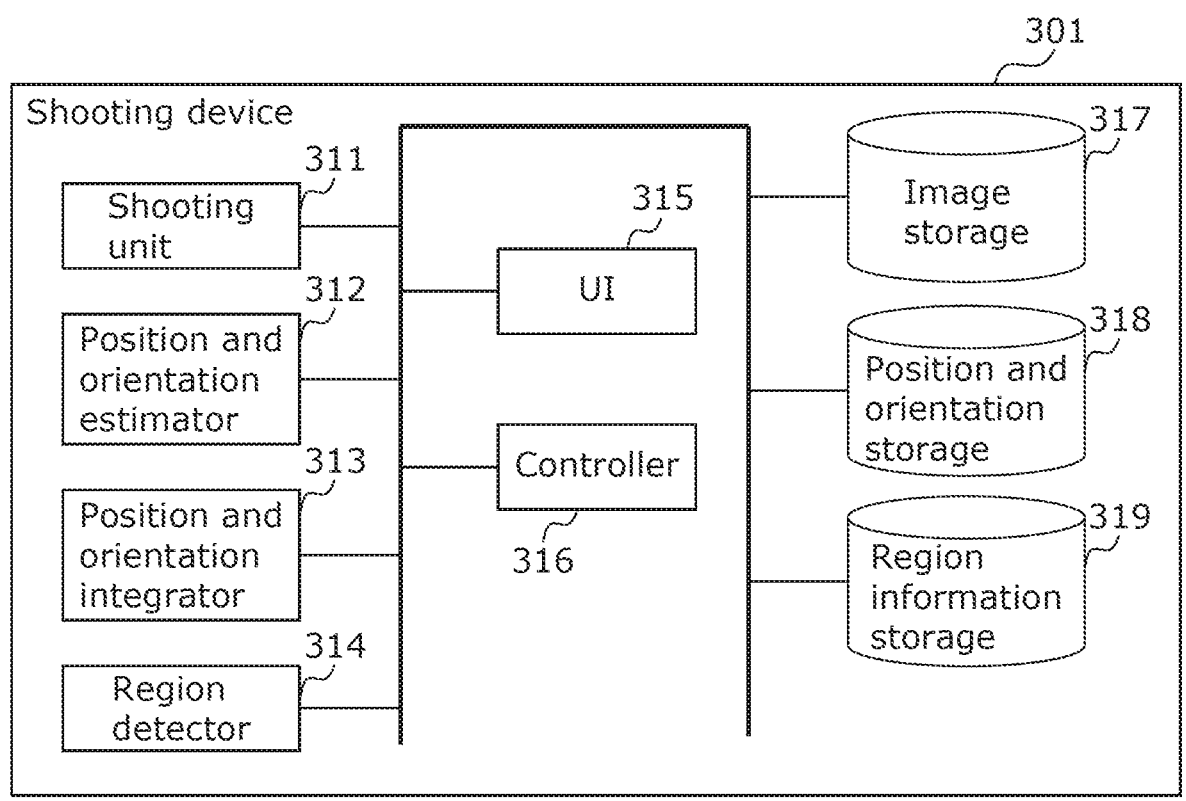
FIG. 21 is a block diagram illustrating a terminal device according to Embodiment 2.

Next, a configuration of shooting device 301 will be described. FIG. 21 is a block diagram of shooting device 301. Shooting device 301 includes shooting unit 311, position and orientation estimator 312, position and orientation integrator 313, region detector 314, UI 315, controller 316, image storage 317, position and orientation storage 318, and region information storage 319.

Shooting unit 311 is a shooting device, such as a camera, and obtains an image (moving image). Although examples in which a moving image is used will be mainly described below, a plurality of static images may be used instead of the moving image. Shooting unit 311 stores the obtained image in image storage 317. Shooting unit 311 may shoot a visible light image or non-visible light image (such as an infrared image). When the infrared image is used, shooting is possible even in a dark environment, such as in the nighttime. Shooting unit 311 may be a monocular camera or a stereo camera or other camera having a plurality of lenses. By using a calibrated stereo camera, the precision of the three-dimensional position and orientation can be improved. Shooting unit 311 may be equipment capable of shooting a depth image, such as an RGB-D sensor. In that case, since a depth image serving as three-dimensional information can be obtained, the precision of estimation of the camera position/orientation can be improved. In addition, the depth image can be used as information for alignment in the integration of three-dimensional orientations described later.

Controller 316 controls the whole of the shooting processing and the like of shooting device 301. Position and orientation estimator 312 estimates the three-dimensional position and orientation (position/orientation) of the camera shooting the image using the image stored in image storage 317. Position and orientation estimator 312 also stores the estimated position/orientation in position and orientation storage 318. For example, position and orientation estimator 312 uses image processing, such as simultaneous localization and mapping (SLAM), to estimate the position/orientation. Alternatively, position and orientation estimator 312 may calculate the position and orientation of the camera using information obtained by various sensors (GPS or acceleration sensor) provided in shooting device 301. In the former case, the position and orientation can be estimated from information from shooting unit 311. In the latter case, the image processing can be achieved with low processing load.

When performing a plurality of shootings in one environment, position and orientation integrator 313 integrates the positions/orientations of the camera estimated in the shootings to calculate a position/orientation that can be handled in one space. Specifically, position and orientation integrator 313 uses, as reference coordinate axes, three-dimensional coordinate axes of the position/orientation obtained in the first shooting. Position and orientation integrator 313 then converts the coordinates of the positions/orientations obtained in the second and following shootings into coordinates in the space defined by the reference coordinate axes.

Region detector 314 detects a region that cannot be three-dimensionally reconstructed in the target space or a region having a low three-dimensional reconstruction precision using the images stored in image storage 317 and the positions/orientations stored in position and orientation storage 318. The region that cannot be three-dimensionally reconstructed in the target space is a region no image of which has been shot, for example. The region having a low three-dimensional reconstruction precision is a region the number of images of which is small (smaller than a predetermined number), for example. When three-dimensional position information is generated, the region having a low precision may also be a region the error between the actual position and the generated three-dimensional position information is great. Region detector 314 stores information on the detected region in region information storage 319. Region detector 314 may detect a region that can be three-dimensionally reconstructed, and determine the other regions than the detected region as regions that cannot be three-dimensionally reconstructed.

The information stored in region information storage 319 may be two-dimensional information superimposed on an image or three-dimensional information, such as three-dimensional coordinate information.

UI 315 presents, to the user, the shot image and the region information detected by region detector 314. UI 315 also has an input function that allows the user to input a shooting start instruction and a shooting end instruction. For example, UI 315 is a display with a touch panel.

Figure 22:
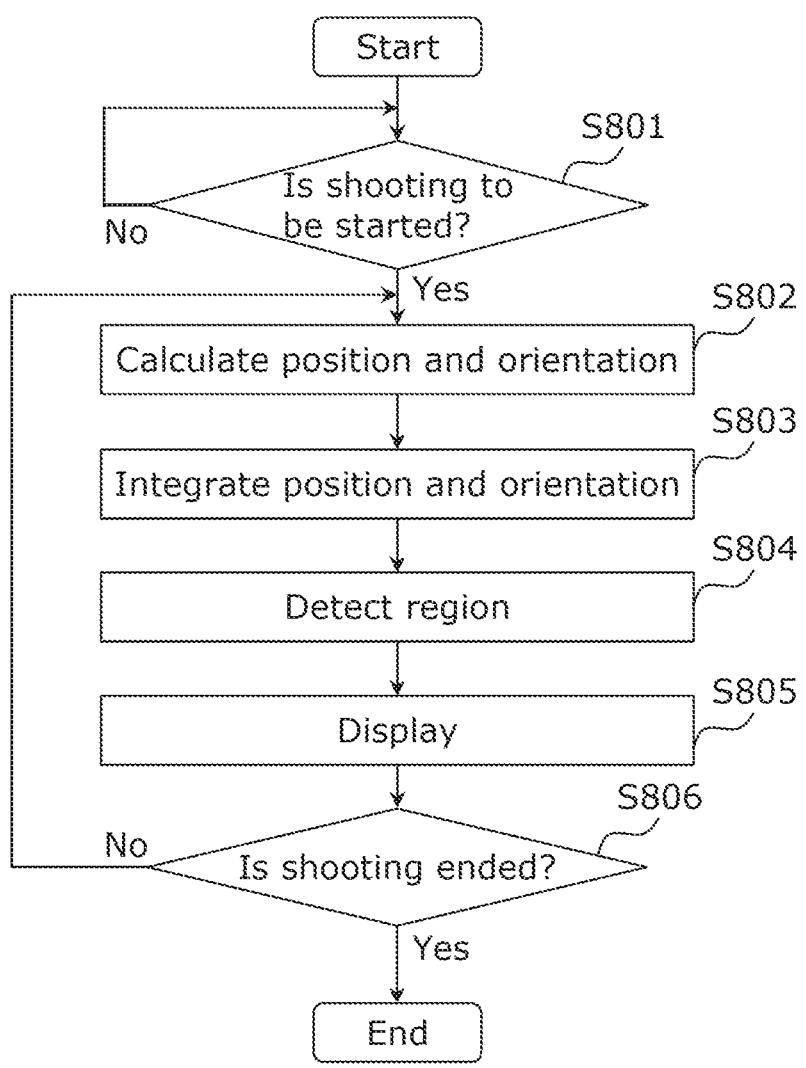
FIG. 22 is a flowchart illustrating an operation of a shooting device according to Embodiment 2.

Next, an operation of shooting device 301 according to the present embodiment will be described. FIG. 22 is a flowchart illustrating an operation of shooting device 301. Shooting device 301 starts and ends shooting in response to an instruction from the user. Specifically, shooting is started by a shooting start button on the UI being depressed. When a shooting start instruction is input (Yes in S801), shooting unit 311 starts shooting. The shot image is stored in image storage 317.

Position and orientation estimator 312 then calculates a position/orientation each time an image is added (S802). The calculated position/orientation is stored in position and orientation storage 318. When there is a three-dimensional point cloud generated by SLAM or the like in addition to the position/orientation, the generated three-dimensional point cloud is also stored.

Position and orientation integrator 313 then integrates the positions/orientations (S803). Specifically, position and orientation integrator 313 determines, using the estimation result of positions/orientations and the images, whether the three-dimensional coordinate space of the positions/orientations for the previously shot images and the three-dimensional coordinate space of the position/orientation for a new shot image can be integrated, and integrates the three-dimensional coordinate spaces if they can be integrated. That is, position and orientation integrator 313 converts the coordinates of the position/orientation for a new shot image into a coordinate system of the previous positions/orientations. As a result, a plurality of positions/orientations is expressed in one three-dimensional coordinate space. Therefore, data obtained by a plurality of shootings can be commonly used, and the precision of estimation of positions/orientations can be improved.

Region detector 314 then detects a shot region or the like (S804). Specifically, region detector 314 generates three-dimensional position information (such as a three-dimensional point cloud, a three-dimensional model, or a depth image) using the estimation result of positions/orientations and the images, and detects a region that cannot be three-dimensionally reconstructed or a region having a low three-dimensional reconstruction precision using the generated three-dimensional position information. Region detector 314 stores information on the detected region in region information storage 319. UI 315 then displays the information on the region obtained in the process described above (S805).

The series of processing is repeatedly performed until the shooting ends (S806). For example, the series of processing is repeatedly performed each time one or more frames of images are obtained.

Figure 23:
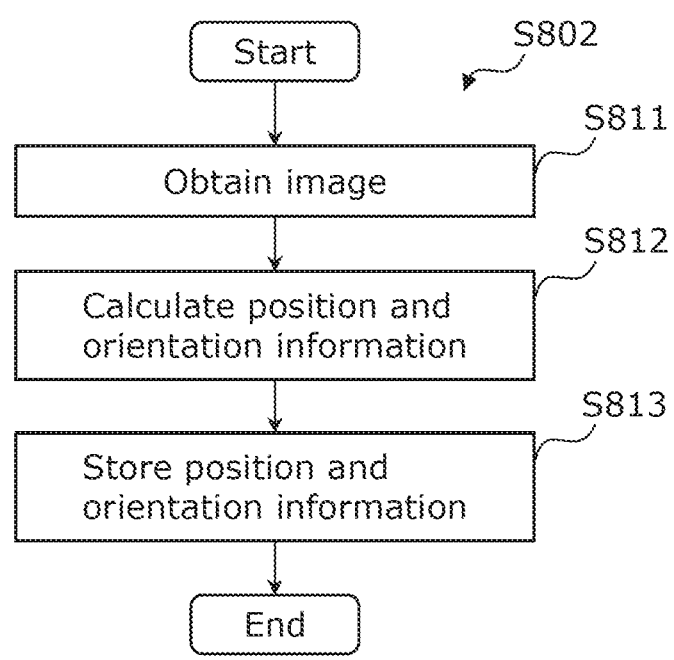
FIG. 23 is a flowchart of position/orientation estimation processing according to Embodiment 2.

FIG. 23 is a flowchart of position/orientation estimation processing (S802). First, position and orientation estimator 312 obtains images from image storage 317 (S811). Position and orientation estimator 312 then calculates the position/orientation of the camera in each image using the obtained images (S812). For example, position and orientation estimator 312 uses image processing, such as SLAM or structure from motion (SfM), to calculate the position/orientation. When shooting device 301 has a sensor, such as an inertial measurement unit (IMU), position and orientation estimator 312 may estimate the position/orientation using information obtained by the sensor.

Position and orientation estimator 312 may use, as a camera parameter such as a lens focal length, a result obtained by a calibration previously performed. Alternatively, position and orientation estimator 312 may calculate a camera parameter at the same time as the position/orientation estimation.

Position and orientation estimator 312 then stores the information on the calculated positions/orientations in position and orientation storage 318 (S813). When the calculation of the information on the position/orientation has failed, information indicating the failure may be stored in position and orientation storage 318. This allows the user to know the location and time of the failure and in what kind of image the failure has occurred, and such information can be used for re-shooting or the like.

Figure 24:
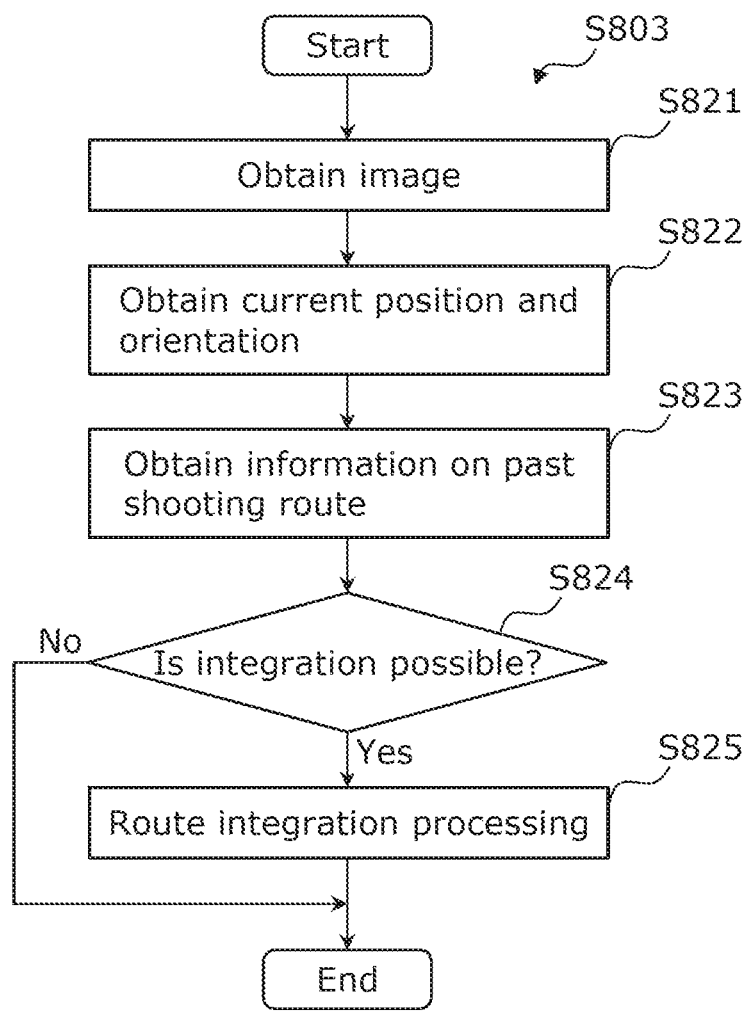
FIG. 24 is a flowchart of position and orientation integration processing according to Embodiment 2.

FIG. 24 is a flowchart of the position and orientation integration processing (S803). First, position and orientation integrator 313 obtains an image from image storage 317 (S821). Position and orientation integrator 313 then obtains the current position/orientation (S822). Position and orientation integrator 313 then obtains the image and position/orientation for at least one past shooting route that is different from the current route (S823). For example, the past shooting route can be generated from time-series information on the positions/orientations of the camera obtained by SLAM. The information on the past shooting route is stored in position and orientation storage 318, for example. Specifically, the result of SLAM is stored in each trial of shooting, and in the N-th shooting (along the current route), the three-dimensional coordinate axes of the N-th shooting are integrated with the three-dimensional coordinate axes of the first to N−1-th results (along the past routes). Instead of the result of SLAM, position information obtained by GPS or Bluetooth (registered trademark) may be used.

Position and orientation integrator 313 then determines whether the integration is possible (S824). Specifically, position and orientation integrator 313 determines whether the current position/orientation and image are similar to the position/orientation and image for a past shooting route obtained, and determines that they can be integrated if they are similar to each other and that they cannot be integrated if they are not similar to each other. More specifically, position and orientation integrator 313 calculates, from each image, a feature quantity representing characteristics of the whole image, and compares the feature quantities to determine whether the relevant images are shot from similar viewpoints. When shooting device 301 has GPS, and the absolute position of shooting device 301 is known, position and orientation integrator 313 may use the information to determine an image that is the same as the current image or shot from a similar position to the current image.

When the integration is possible (Yes in S824), position and orientation integrator 313 performs route integration processing (S825). Specifically, position and orientation integrator 313 calculates three-dimensional relative positions of the current image with respect to a reference image obtained by shooting a region similar to the region of the current image. Position and orientation integrator 313 calculates the coordinates of the current image by adding the calculated three-dimensional relative positions to the coordinates of the reference image.

Figure 25:
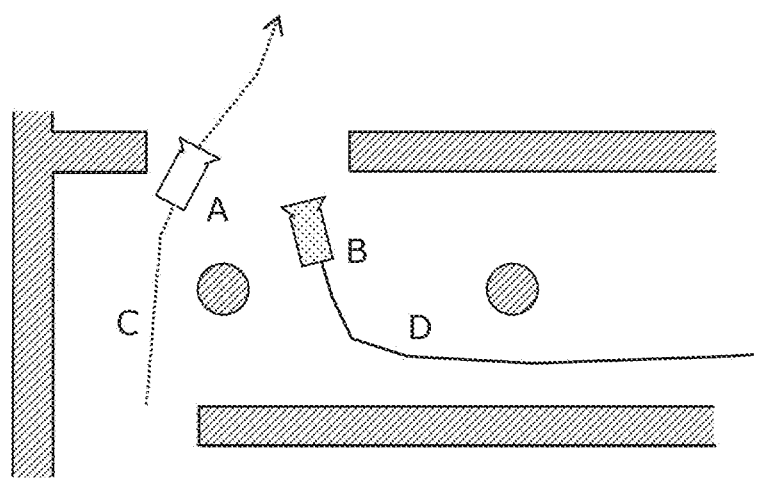
FIG. 25 is a plan view illustrating shooting in a target space according to Embodiment 2.
Figure 26:
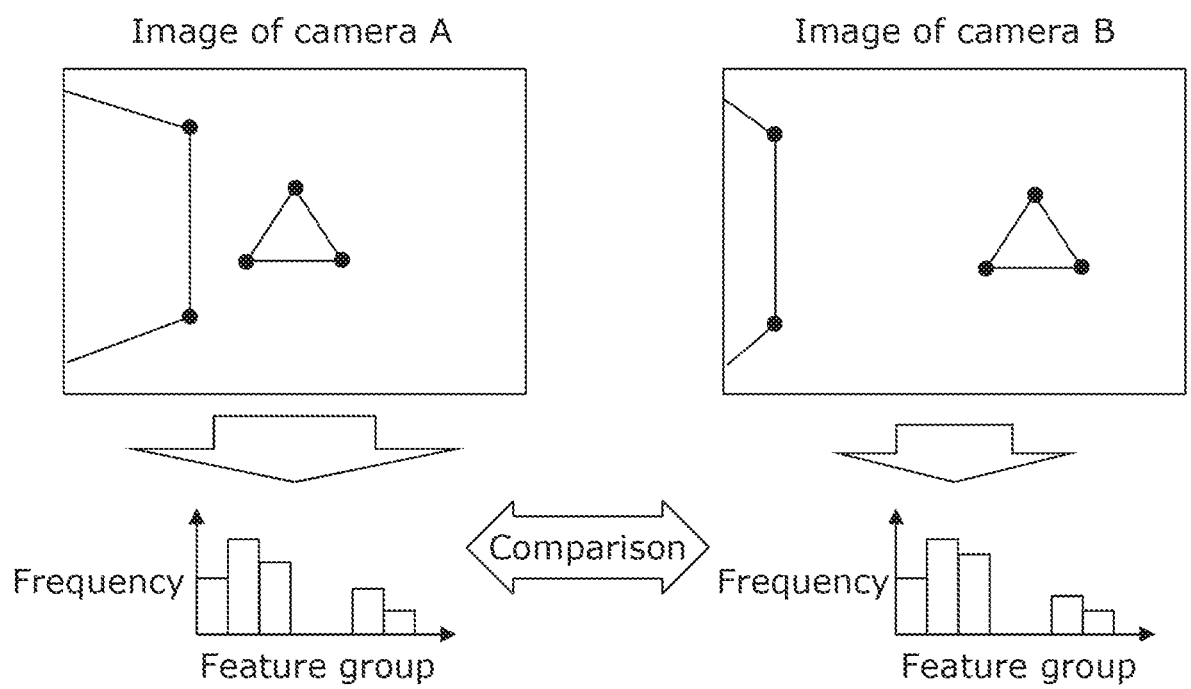
FIG. 26 is a diagram illustrating example images and example comparison processing according to Embodiment 2.

In the following, a specific example of the route integration processing will be described. FIG. 25 is a plan view illustrating shooting in a target space. Route C is a route of camera A used for shooting in the past whose position/orientation is already estimated. This drawing illustrates a case where camera A is located at a predetermined position on route C. Route D is a route of camera B being currently used for shooting. In this situation, current camera B and camera A have similar fields of view for shooting. Although an example is shown here in which two images are obtained with different cameras, two images shot by the same camera at different points in time may be used. FIG. 26 is a diagram illustrating example images and comparison processing in this case.

As illustrated in FIG. 26, position and orientation integrator 313 extracts feature quantities, such as Oriented FAST and Rotated BRIEF (ORB) feature quantities, from each image, and extracts feature quantities of the whole image based on the distribution or number thereof. For example, position and orientation integrator 313 clusters feature quantities occurring in the image like in the bag of words model, and uses a histogram for each class as a feature quantity.

Position and orientation integrator 313 compares the feature quantities of the whole image between the images. When it is determined that the images are images of the same part, a relative three-dimensional positional relationship between the cameras is calculated by performing feature point matching between the images. In other words, position and orientation integrator 313 searches a plurality of images for the past shooting route for an image the feature quantities of the whole of which are similar to those of the current image. Based on the positional relationship, position and orientation integrator 313 converts the three-dimensional position of route D into the coordinate system of route C. In this way, a plurality of routes can be expressed in one coordinate system. In this way, positions/orientations for a plurality of routes can be integrated.

When shooting device 301 has a sensor capable of detecting an absolute position, such as GPS, position and orientation integrator 313 may use the detection result to perform the integration processing. For example, position and orientation integrator 313 may perform processing using the detection result from the sensor instead of performing the processing using images described above, or may use detection result from the sensor in addition to the images. For example, position and orientation integrator 313 may use GPS information to narrow down the images to be used for comparison. Specifically, position and orientation integrator 313 designate, as being used for comparison, images the latitude and longitude of the positions/orientations for which fall within a range of ±0.001 degrees from the latitude and longitude of the current camera position according to GPS. In this way, the processing amount can be reduced.

Figure 27:
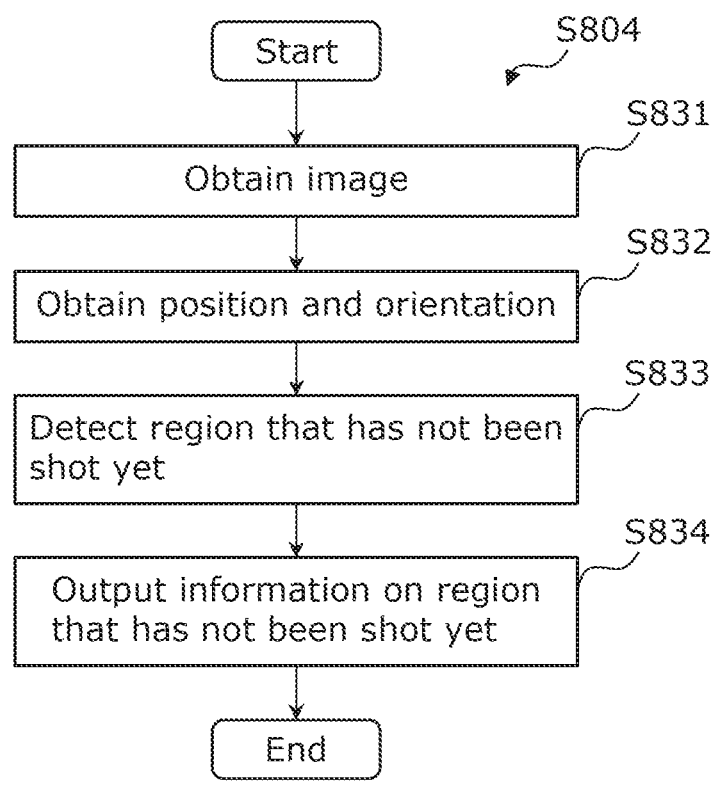
FIG. 27 is a flowchart of region detection processing according to Embodiment 2.

FIG. 27 is a flowchart of the region detection processing (S804). First, region detector 314 obtains an image from image storage 317 (S831). Region detector 314 then obtains a position/orientation from position and orientation storage 318 (S832). Region detector 314 also obtains a three-dimensional point cloud representing the three-dimensional position of a feature point generated by SLAM or the like from position and orientation storage 318.

Region detector 314 then detects a region that has not been shot yet using the obtained image, position/orientation, and three-dimensional point cloud (S833). Specifically, region detector 314 projects the three-dimensional point cloud onto the image, and determines a vicinity of a pixel on which a three-dimensional point is projected (within a predetermined distance from the pixel) as a region that can be reproduced (a shot region). The predetermined distance described above may be increased as the distance of the projected three-dimensional point from the shooting position increases. When a stereo camera is used, region detector 314 may estimate the region that can be reproduced from a parallax image. When an RGB-D camera is used, the determination may be made using the obtained depth value. Details of the processing of determining a shot region will be described later. Region detector 314 may not only determine whether a three-dimensional model can be generated but also estimate the precision of the three-dimensional reconstruction.

Finally, region detector 314 outputs the obtained region information (S834). The region information may be region information superimposed on the shot image or may be region information arranged in a three-dimensional space, such as a three-dimensional map.

Figure 28:
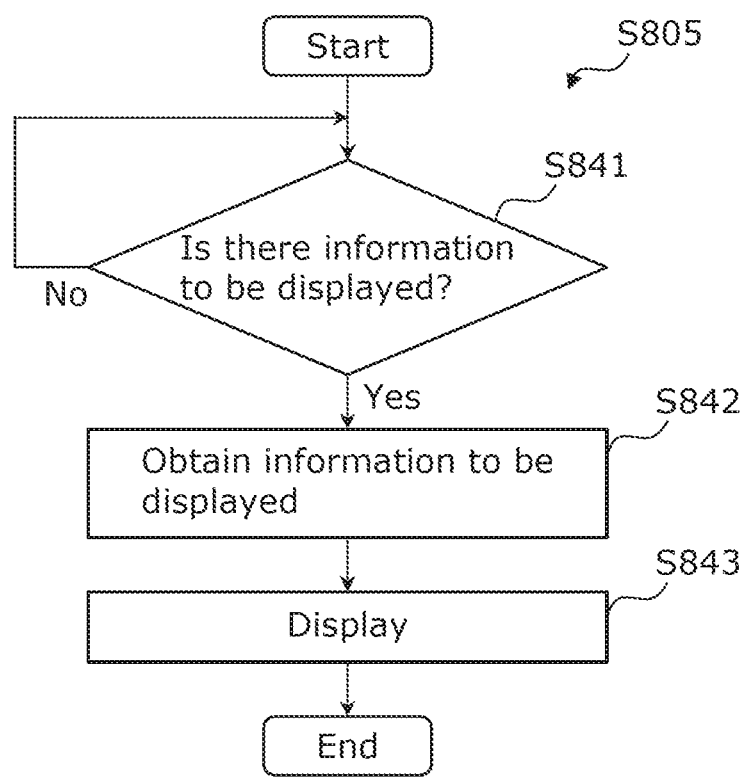
FIG. 28 is a flowchart of display processing according to Embodiment 2.

FIG. 28 is a flowchart of the display processing (S805). First, UI 315 checks whether there is information to be displayed (S841). Specifically, UI 315 checks whether there is a newly added image in image storage 317, and determines that there is information to be displayed if there is a newly added image in image storage 317. UI 315 also checks whether there is newly added information in region information storage 319, and determines that there is information to be displayed if there is newly added information in region information storage 319.

When there is information to be displayed (Yes in S841), UI 315 obtains the information to be displayed, such as an image or region information (S842). UI 315 then displays the obtained information to be displayed (S843).

Figure 29:
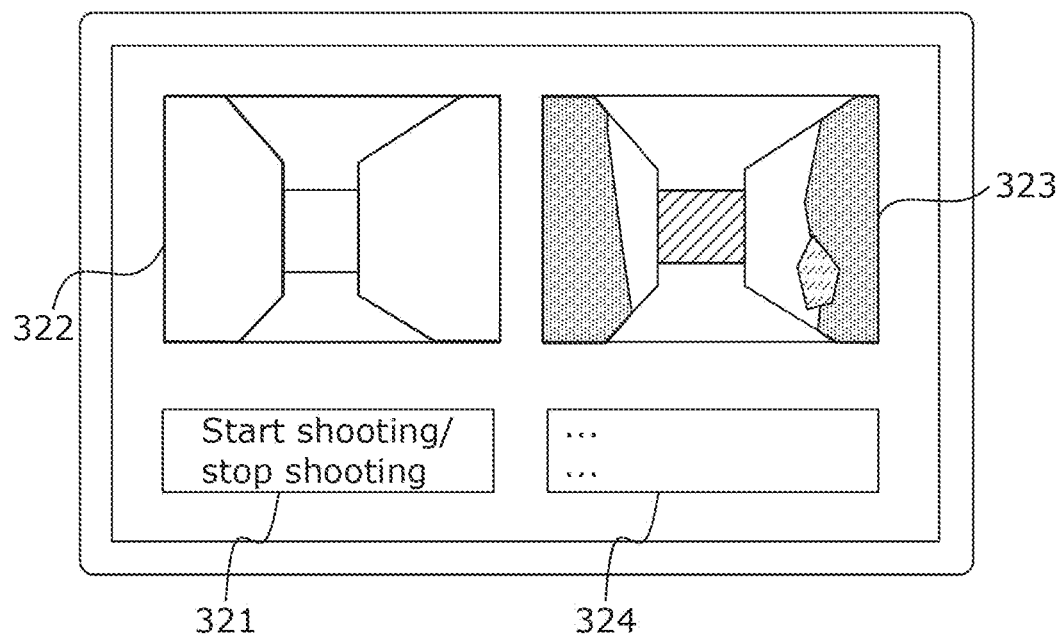
FIG. 29 is a diagram illustrating an example of an UI screen displayed according to Embodiment 2.

FIG. 29 is a diagram illustrating an example of an UI screen displayed by UI 315. The UI screen includes shooting start/shooting stop button 321, currently-shot image 322, region information 323, and text display region 324.

Shooting start/shooting stop button 321 is an operation unit for the user to instruct to start and stop shooting. Currently-shot image 322 is an image being currently shot. Region information 323 shows a shot region, a low-precision region and the like. Here, the low-precision region is a region the precision of the three-dimensional model generated using the shot image of which is low. Text display region 324 shows, by text, information on a region that has not been shot yet or a low-precision region. Audio or the like may be used instead of text.

Figure 30:
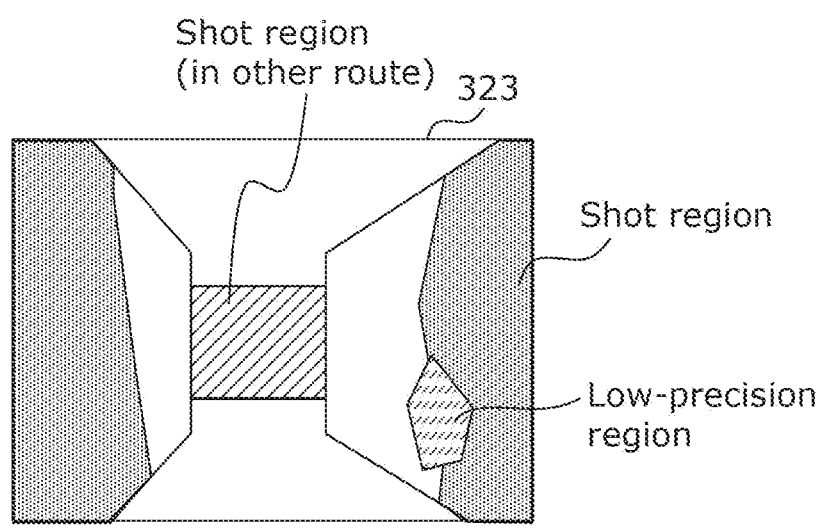
FIG. 30 is a diagram illustrating an example of region information according to Embodiment 2.

FIG. 30 is a diagram illustrating an example of region information 323. As illustrated in FIG. 30, for example, information indicating each region is superimposed on a currently-shot image. As the shooting viewpoint moves, the displayed region information 323 is changed in real time. This allows the user to easily know the shot region and the like while seeing the image shot at the current camera viewpoint. For example, the shot region and the low-precision region are displayed in different colors. The region shot in the current route and the region shot in another route are also displayed in different colors. The information indicating each region may be information superimposed on the image as illustrated in FIG. 30, or may be a text or symbol. That is, the information can be any information that allows the user to visually discriminate each region. In this way, the user can know that the user should shoot a region that is not colored and a low-precision region, and therefore can avoid missing shooting. In addition, to perform the route integration processing, a region that should be shot can be presented to the user so that the shot region is continuous to the region shot in another route.

A region to which the user's attention needs to be attracted, such as a low-precision region, can be made to blink, for example, so as to attract the user's attention. The image on which the region information is superimposed may be a past image.

Although currently-shot image 322 and region information 323 are separately displayed here, the region information may be superimposed on currently-shot image 322. In that case, the area required for the display can be reduced, so that the image and information are more visible on a small terminal, such as a smartphone. Therefore, the way of display may be switched depending on the type of the terminal. For example, the region information may be superimposed on currently-shot image 322 on a terminal having a small screen size, such as a smartphone, and currently-shot image 322 and region information 323 may be separately displayed on a terminal having a large screen size, such as a tablet terminal.

UI 315 presents, by text or audio, how many meters back from the current position a low-precision region occurred, for example. The distance can be calculated from the result of position estimation. By using text information, the user can be correctly notified of the information. When using audio, the user can be safely notified, since the user can keep paying attention to shooting.

The region information may be superimposed on the real space by means of an augmented reality (AR) glasses or a head-up display (HUD), rather than being two-dimensionally displayed on the image. In that case, the compatibility with the video obtained from the actual viewpoint increases, and the part that should be shot can be intuitively presented to the user.

Figure 31:
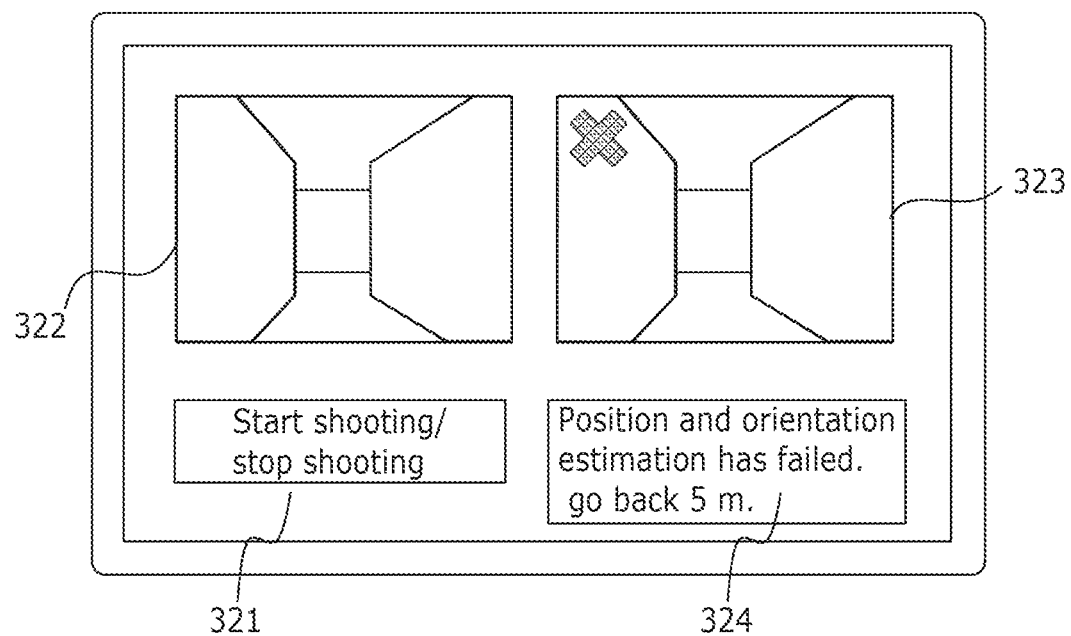
FIG. 31 is a diagram illustrating an example display in a case where the position/orientation estimation has failed according to Embodiment 2.

When the position/orientation estimation has failed, shooting device 301 may notify the user of the failure of the position/orientation estimation. FIG. 31 is a diagram illustrating an example display in that case.

For example, an image for which the position/orientation estimation failed may be displayed in region information 323. Furthermore, a text or audio that prompts the user to redo shooting from that position may be presented. This allows the user to quickly redo shooting after failure.

Shooting device 301 may predict the position of the failure from the elapsed time since the failure and the moving speed, and present audio or text information that "go back 5 m" or the like. Alternatively, shooting device 301 may display a two-dimensional map or three-dimensional map, and present the position of the shooting failure on the map.

Shooting device 301 may detect that the user has come back to the position of the failure, and present that to the user by text, image, sound, vibration or the like. For example, that the user has come back to the position of the failure can be detected using the feature quantities of the whole image.

When shooting device 301 detects a low-precision region, shooting device 301 may instruct the user to redo shooting and indicate a way of shooting. Here, the way of shooting is to zoom in on the region, for example. For example, shooting device 301 may give this instruction by text, image, sound, vibration or the like.

In this way, the quality of the data obtained can be improved, and the precision of the generated three-dimensional model can be improved.

Figure 32:
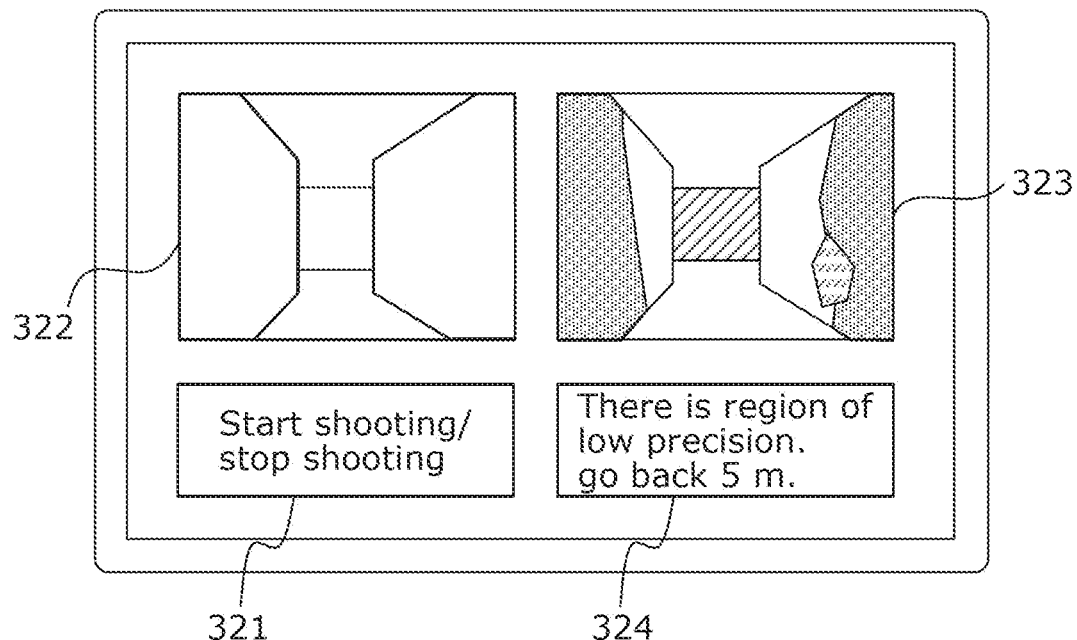
FIG. 32 is a diagram illustrating an example display in the case where a low-precision region is detected, according to Embodiment 2.

FIG. 32 is a diagram illustrating an example display in the case where a low-precision region is detected. For example, as illustrated in FIG. 32, text is used to give instructions to the user. In this example, in text display region 324, that a low-precision region is detected is displayed. In addition, an instruction for the user to shoot the low-precision region, such as "go back 5 m", is displayed. Shooting device 301 may dismiss these messages when shooting device 301 detects that the user has moved to the indicated position or has shot the indicated region.

Figure 33:
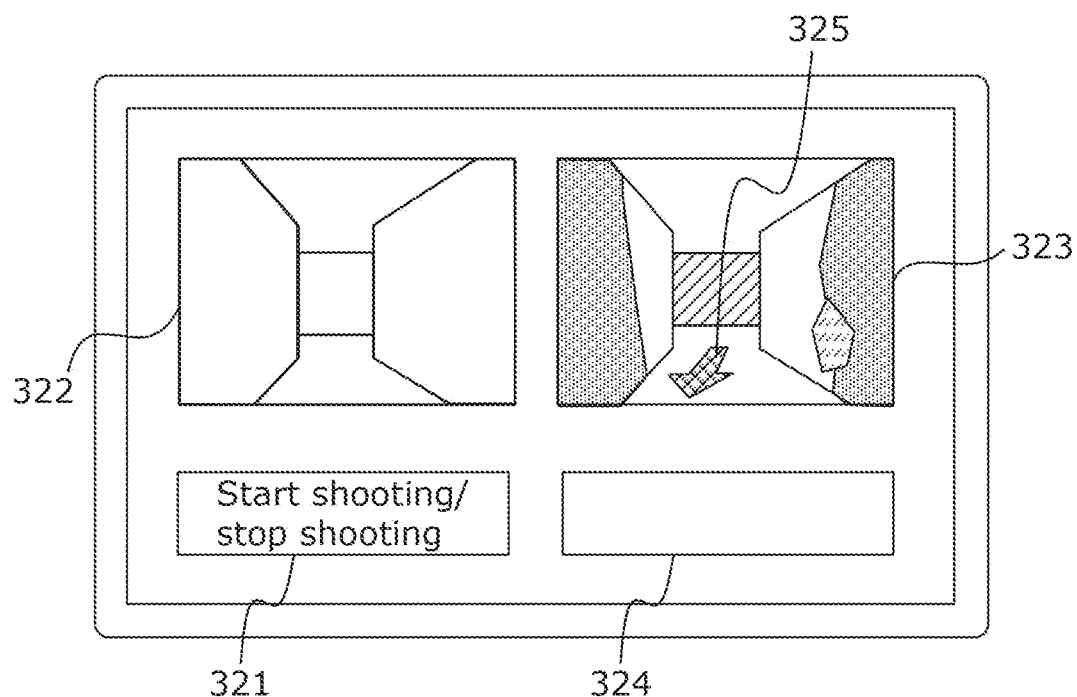
FIG. 33 is a diagram illustrating an example of the instruction to a user according to Embodiment 2.
Figure 34:
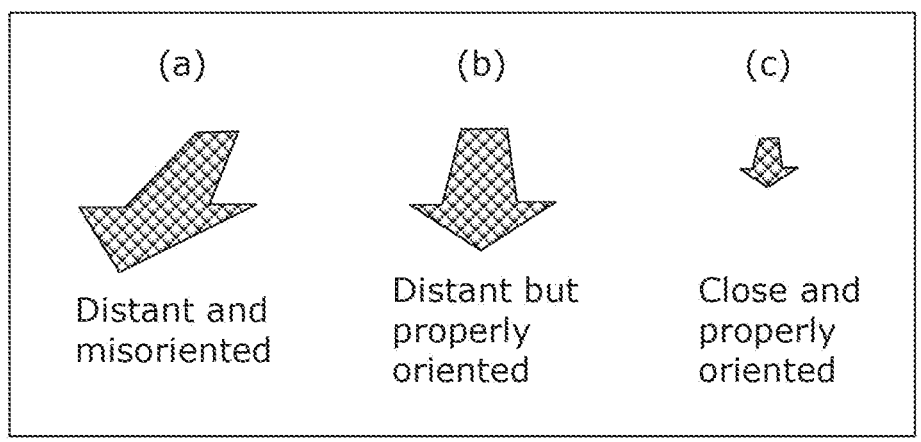
FIG. 34 is a diagram illustrating examples of instructions (arrows) according to Embodiment 2.

FIG. 33 is a diagram illustrating another example of the instruction to the user. For example, arrow 325 illustrated in FIG. 33 indicates, to the user, the direction and distance of movement. FIG. 34 is a diagram illustrating examples of this arrow. For example, as illustrated in FIG. 34, the direction of movement is indicated by the angle of the arrow, and the distance to the destination is indicated by the size of the arrow. The way of display of the arrow may be changed depending on the distance. For example, the way of display may be color, or the presence or absence or the magnitude of an effect. The effect is blinking, motion, or zooming in and out, for example. Alternatively, the darkness of the arrow may be changed. For example, as the distance becomes shorter, the magnitude of the effect may increase, or the color of the arrow may become darker. A plurality of these may be used in combination.

Any indication other than the arrow, such as a triangle or a finger icon, that can indicate direction can be used.

Region information 323 may be superimposed on an image from a third party's viewpoint, such as a plan view or perspective view, rather than on the image being currently shot. For example, in an environment in which a three-dimensional map is available, a shot region or the like may be superimposed and displayed on the three-dimensional map.

Figure 35:
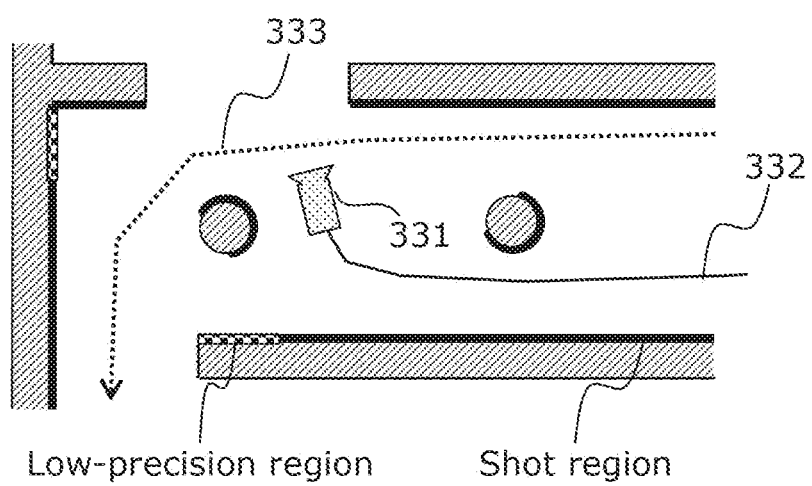
FIG. 35 is a diagram illustrating an example of region information according to Embodiment 2.

FIG. 35 is a diagram illustrating an example of region information 323 in that case. FIG. 35 is a diagram showing a three-dimensional map in plan view, and shows a shot region and a low-precision region. Furthermore, current camera position 331 (the position and direction of shooting device 301), current route 332, and past route 333 are also shown.

When there is a map, such as CAD, of the target space at the construction site or the like, or when a three-dimensional model was generated in the past at the same place and three-dimensional map information has already been generated, shooting device 301 can use the map or map information. When GPS or the like is available, shooting device 301 can also create map information based on the latitude and longitude information obtained by GPS.

As described above, by superimposing the result of estimation of the position/orientation of the camera and the shot region on the three-dimensional map and displaying them as a bird's eye view, the user can easily know which region has been shot and which route was used for shooting, for example. For example, in the example illustrated in FIG. 35, the user can be made aware of a part missing in the shooting, such as that the backsides of the pillars have not been shot, of which the user can hardly be made aware by presentation of an image during shooting, and therefore, the shooting can be efficiently performed.

In an environment where CAD or the like is not available, similarly, a view from a third party's viewpoint can be used without a map. In that case, since there is no object serving as a reference, the viewability is low, although the user can know the positional relationship between the current shooting position and the low-precision region. The user can also confirm that a region where an object is expected to exist has not been shot. Therefore, in this case, again, the efficiency of the shooting can be improved.

Although an example where a plan view is used has been shown here, map information from other viewpoints can also be used. Shooting device 301 may have a function of changing the viewpoint of the three-dimensional map. For example, an UI that allows the user to change the viewpoint may be used.

Shooting device 301 may display both region information 323 illustrated in FIG. 29 or the like described above and region information illustrated in FIG. 35, or may have a function of switching between these screens.

Next, examples of the method of determining a shot region and the method of presenting the shot region will be described. When SLAM is used in the estimation of the camera position, a three-dimensional point cloud relating to a feature point, such as a corner of an object in the image, is generated in addition to the position and orientation information on the camera. The region in which the three-dimensional point is generated can be determined as a region whose three-dimensional model can be generated, so that a shot region can be presented on the image by projecting the three-dimensional point onto the image.

Figure 36:
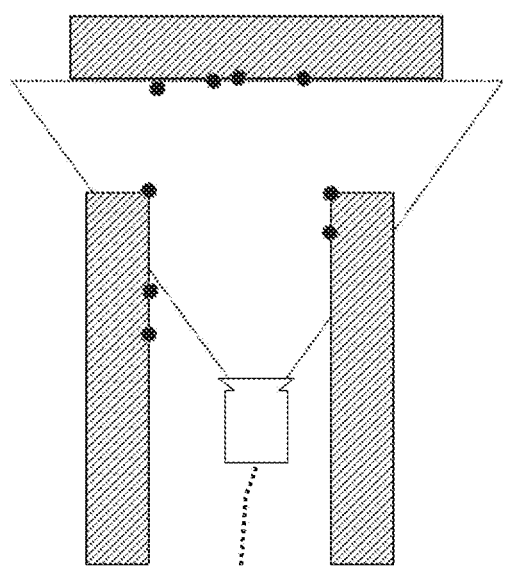
FIG. 36 is a plan view illustrating a shooting of a target region according to Embodiment 2.
Figure 37:
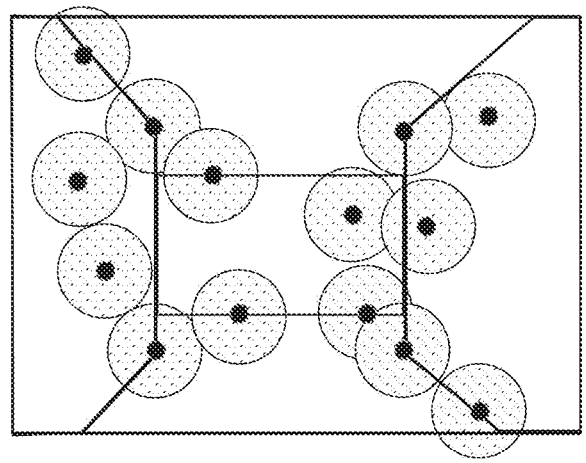
FIG. 37 is a diagram illustrating an example of shot regions in a case where three-dimensional points are used according to Embodiment 2.

FIG. 36 is a plan view illustrating a shooting of a target region. Black dots in the drawing represent three-dimensional points (feature points) generated. FIG. 37 is a diagram illustrating an example where three-dimensional points are projected onto an image, and regions in vicinities of the three-dimensional points are determined as shot regions.

Figure 38:
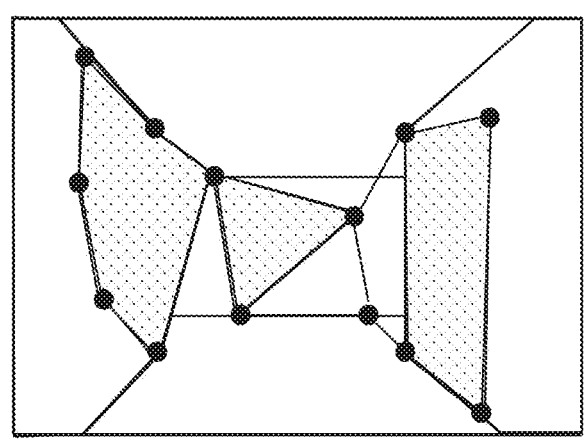
FIG. 38 is a diagram illustrating an example of shot regions in a case where a mesh is used according to Embodiment 2.

Shooting device 301 may generate a mesh by connecting the three-dimensional points, and determine a shot region based on the mesh. FIG. 38 is a diagram illustrating an example of shot regions in that case. As illustrated in FIG. 38, shooting device 301 may determine regions of meshes generated as shot regions.

When shooting device 301 uses a stereo camera or RGB-D sensor, shooting device 301 may determine a shot region using a parallax image or depth image obtained by the camera or sensor. In that case, dense three-dimensional information can be obtained with light processing, so that shot regions can be more precisely determined.

Although SLAM is used for the self-position estimation (position/orientation estimation) in this example, the present disclosure is not limited to this, as far as the position/orientation of the camera can be estimated during shooting.

Shooting device 301 may predict the precision of the reproduction and display the predicted precision, in addition to presenting the shot region. Specifically, a three-dimensional point is calculated from a feature point in the image. When the three-dimensional point is projected onto the image, the projected three-dimensional point may deviate from the reference feature point. The deviation is referred to as a reprojection error, and the precision can be evaluated using the reprojection error. Specifically, the precision is determined to be lower as the reprojection error increases.

For example, shooting device 301 may indicate the precision by the color of the shot region. For example, a high-precision region is indicated in blue, and a low-precision region is indicated in red. The precision may be indicated stepwise by the difference or darkness of the color. This allows the user to easily know the precision of each region.

Figure 39:
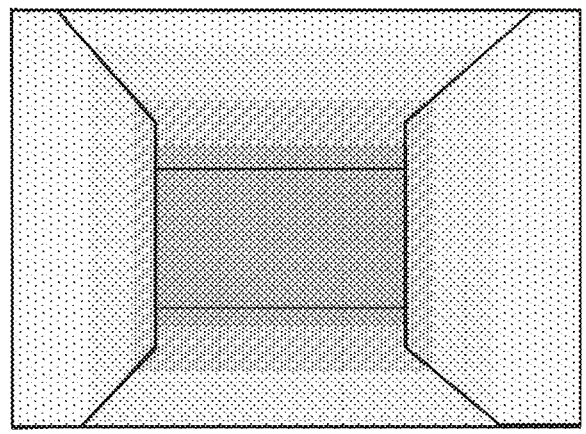
FIG. 39 is a diagram illustrating an example of a depth image according to Embodiment 2.

Shooting device 301 may use a depth image obtained by an RGB-D sensor or the like to determine whether the reproduction is possible or evaluate the precision. FIG. 39 is a diagram illustrating an example of the depth image. In this drawing, the darker the color (or the denser the hatching), the farther the part is.

Figure 40:
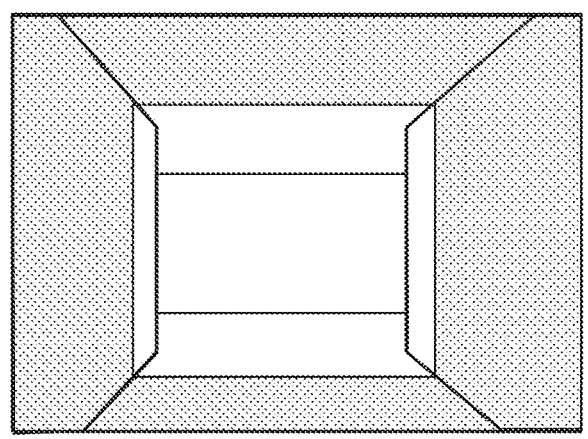
FIG. 40 is a diagram illustrating an example of shot regions in a case where a depth image is used according to Embodiment 2.

Here, the precision of the three-dimensional model generated tends to increase as the distance from the camera decreases, and to decrease as the distance increases. Therefore, for example, shooting device 301 may determine that pixels in a predetermined depth range (such as up to a depth of 5 m) as being within a shot range. FIG. 40 is a diagram illustrating an example where a region in a predetermined depth range is determined as a shot region. In this drawing, the hatched region is determined as a shot region Shooting device 301 may determine the precision of a region based on the distance to the region. That is, shooting device 301 may determine the precision to be higher as the distance decreases. For example, the relationship between the distance and the precision may be linearly or otherwise defined.

When using a stereo camera, shooting device 301 can generate a depth image from a parallax image, and therefore can determine the shot region and the precision in the same manner as when using a depth image. In that case, shooting device 301 may determine, as a region that cannot be reproduced (a region that has not been shot), a region for which the depth value cannot be calculated from the parallax image. Alternatively, shooting device 301 may estimate the depth value based on pixels in the vicinity thereof for a region for which the depth value cannot be calculated. For example, shooting device 301 calculates an average value of 5 by 5 pixels centered about a target pixel.

The three-dimensional positions of the shot regions determined as described above and the information indicating the precision of each three-dimensional position are accumulated. Since the coordinates of the positions/orientations of the camera are integrated as described above, the coordinates of the obtained region information can also be integrated. In this way, the three-dimensional positions of the shot regions in the target space and the information indicating the precision of each three-dimensional position are generated.

Figure 41:
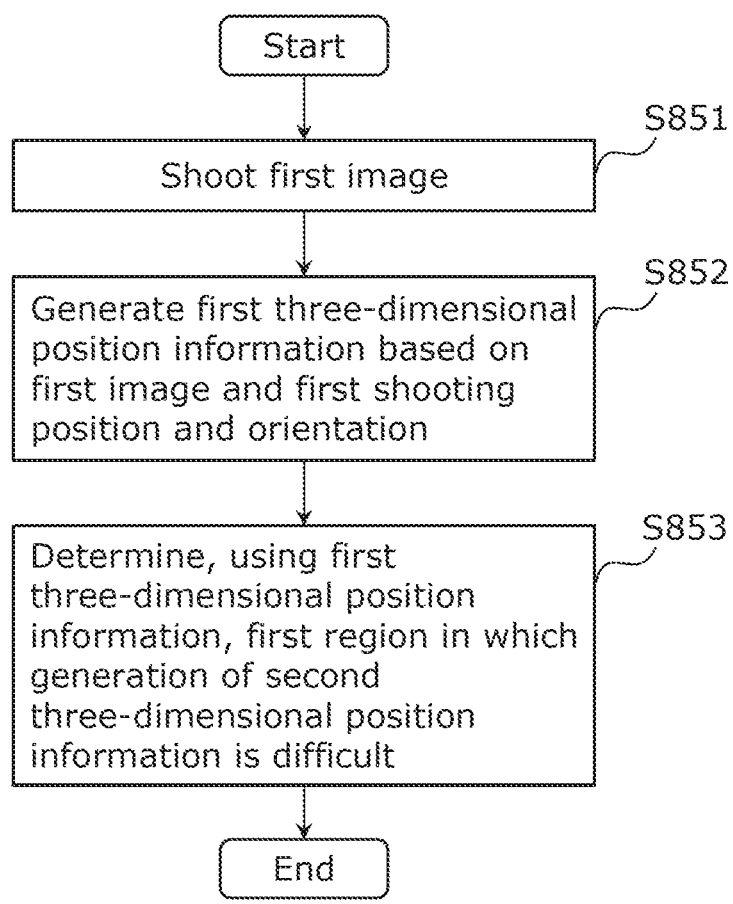
FIG. 41 is a flowchart illustrating a shooting method according to Embodiment 2.

As described above, the shooting instruction device according to the present embodiment performs the process shown in FIG. 41. Shooting device 301: shoots first images of a target space (S851); generates first three-dimensional position information (for example, a sparse three-dimensional point cloud or a depth image) of the target space, based on the first images and a first shooting position and a first shooting orientation of each of the first images (S852); and determines a second region of the target space for which generating second three-dimensional position information (for example, a dense three-dimensional point cloud) using the first images is difficult, using the first three-dimensional position information and without generating the second three-dimensional position information, the second three-dimensional position information being more detailed than the first three-dimensional position information (S853).

Here, the region for which generating the three-dimensional position is difficult includes at least one of a region for which the three-dimensional position cannot be calculated and a region for which the error between the three-dimensional position and the actual position is greater than a predetermined threshold. Specifically, the second region includes at least one of (1) a region that is not shot from some of a plurality of shooting viewpoints, (2) a region that has been shot but has a large amount of blurring, (3) a region that has been shot but includes less feature points because of its lower contrast than the other regions, (4) a region that has been shot but is farther from a shooting viewpoint than the other regions, and is estimated to have a great error between the calculated three-dimensional position and the actual position even if the three-dimensional position is calculated, and (5) a region that is more affected by a lens distortion than the other regions. The blurring can be detected by determining a temporal change in position of the feature point, for example.

The detailed three-dimensional position information is three-dimensional position information having high spatial resolution, for example. The spatial resolution of the three-dimensional position information means the distance between two adjacent three-dimensional positions that can be discriminated as different three-dimensional positions. High spatial resolution means that the distance between two adjacent three-dimensional positions is short. That is, three-dimensional position information having higher spatial resolution has information on more three-dimensional positions in a space of a predetermined size. Three-dimensional position information having high spatial resolution may be referred to as dense three-dimensional position information, and three-dimensional position information having low spatial resolution may be referred to as sparse three-dimensional position information.

The detailed three-dimensional position information may be three-dimensional information having a large amount of information. For example, the first three-dimensional position information may be distance information from one viewpoint, such as a depth image, and the second three-dimensional position information may be a three-dimensional model, such as a three-dimensional point cloud, from which distance information from an arbitrary viewpoint can be obtained.

The target space and the subject are the same concept and both mean a region to be shot, for example.

According to shooting device 301, since the second region for which generating the second three-dimensional position information is difficult can be determined using the first three-dimensional position information without generating the second three-dimensional position information, the efficiency of shooting of images used for generating the second three-dimensional position information can be improved.

For example, the second region is at least one of a region in which shooting of an image is not performed or a region for which precision of the second three-dimensional position information is estimated to be lower than a predetermined standard. Here, the reference is a threshold of the distance between two different three-dimensional positions, for example. That is, the second region is a region for which the difference between the generated three-dimensional position information and the actual position is greater than a predetermined threshold when the three-dimensional position information is generated.

For example, the first three-dimensional position information includes a first three-dimensional point cloud, and the second three-dimensional position information includes a second three-dimensional point cloud which is denser than the first three-dimensional point cloud.

For example, in the determining (S853), shooting device 301 determines a third region of the target space which corresponds to a region in a vicinity of the first three-dimensional point cloud (a region that is within a predetermined distance from the first three-dimensional point cloud), and determines a region other than the third region as the second region (for example, FIG. 37).

For example, in the determining (S853), shooting device 301 generates a mesh using the first three-dimensional point cloud, and determines a region other than the third region of the target space as the second region, the third region corresponding to a region in which the mesh is generated (for example, FIG. 38).

For example, in the determining (S853), shooting device 301 determines the second region based on a reprojection error of the first three-dimensional point cloud.

For example, the first three-dimensional position information includes a depth image. For example, as shown in FIG. 40, shooting device 301 determines a region within a predetermined distance from a shooting viewpoint as a third region, and determines a region other than the third region as the second region.

For example, shooting device 301 further combines, using second images that have already been shot, a second shooting position and a second shooting orientation of each of the second images, the first images, and the first shooting positions and the first shooting orientations, coordinate systems of the first shooting positions and the first shooting orientations with coordinate systems of the second shooting positions and the second shooting orientations. Accordingly, shooting device 301 can determine the second region using the information obtained by a plurality of shootings.

For example, shooting device 301 further displays the second region or a third region (for example, a shot region) other than the second region during shooting of the target space (for example, FIG. 30). Accordingly, shooting device 301 can present the second region to the user.

For example, in the displaying, shooting device 301 displays information indicating the second region or the third region, superimposed on any one of the images (for example, FIG. 30). Accordingly, shooting device 301 can present the position of the second region inside the image to the user, and thus the user can easily know the position of the second region.

For example, in the displaying, shooting device 301 displays information indicating the second region or the third region, superimposed on a map of the target space (for example, FIG. 35). Accordingly, shooting device 301 can present the position of the second region in the environment to the user, and thus the user can easily know the position of the second region.

For example, shooting device 301 displays the second region and a reconstruction precision (three-dimensional reconstruction precision) of each region included in the second region. Accordingly, since the user can know the restoration precision of each region, in addition to the second region, the user can perform appropriate shooting based on this.

For example, shooting device 301 further presents, to the user, an instruction for causing the user to shoot an image of the second region (for example, FIG. 32 and FIG. 33). Accordingly, the user can efficiently perform appropriate shooting.

For example, the instruction may include at least one of a direction or a distance from a current position to the second region (for example, FIG. 33 and FIG. 34). Accordingly, the user can efficiently perform appropriate shooting.

For example, the shooting device includes a processor and memory, and, using the memory, the processor performs the above-described processes.

Although a shooting instruction device, a shooting device, and so on, according to embodiments of the present disclosure have been described thus above, the present disclosure is not limited to these embodiments.

For example, the shooting instruction device according to Embodiment 1 and the shooting device according to Embodiment 2 may be combined. For example, the shooting instruction device may include at least some of the processing units included in the shooting device. Furthermore, the shooting device may include at least some of the processing units included in the shooting instruction device. Moreover, at least some of the processing units included in the shooting instruction device and at least some of the processing units included in the shooting device may be combined. In other words, the shooting instruction method according to Embodiment 1 may include at least some of the processes included in the shooting method according to Embodiment 2. Furthermore, the shooting method according to Embodiment 2 may include at least some of the processes included in the shooting instruction method according to Embodiment 1. Moreover, at least some of the processes included in the shooting instruction method according to Embodiment 1 and at least some of the processes included in the shooting method according to Embodiment 2 may be combined.

Furthermore, each of the processing units included in the shooting instruction device, the shooting device, etc., according to the foregoing embodiments is implemented typically as an LSI, which is an integrated circuit (IC). They may take the form of individual chips, or one or more or all of them may be encapsulated into a single chip.

Furthermore, the integrated circuit is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in each of the above embodiments, the respective structural components may be implemented as dedicated hardware or may be realized by executing a software program suited to such structural components. Alternatively, the respective structural components may be implemented by a program executor such as a CPU or a processor reading out and executing the software program recorded in a recording medium such as a hard disk or a semiconductor memory.

Furthermore, the present disclosure may be implemented as a shooting instruction method executed by a shooting instruction device.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the imaging instruction device, etc., according to one or more aspects has been described based on the foregoing embodiments, the present disclosure is not limited to such embodiments. Forms obtained by making various modifications to the above embodiments that can be conceived by those skilled in the art, as well as forms obtained by combining structural components in different embodiments, without materially departing from the spirit of the present disclosure, may be included in the scope of the one or more aspects.

INDUSTRIAL APPLICABILITY

The present disclosure can be applied to shooting instruction devices.

The invention claimed is:

1. A shooting method executed by a shooting device, the shooting method comprising:
    shooting first images of a target space;
    generating a first three-dimensional point cloud of the target space, based on the first images and a first shooting position and a first shooting orientation of each of the first images;
    determining a first region of the target space for which generating a second three-dimensional point cloud is difficult, using the first three-dimensional point cloud and without generating the second three-dimensional point cloud, the second three-dimensional point cloud being denser than the first three-dimensional point cloud, the first region including at least one of a region for which the second three-dimensional point cloud cannot be calculated or a region for which an error between the second three-dimensional point cloud and an actual position is greater than a predetermined threshold;
    shooting second images of the first region; and
    generating the second three-dimensional point cloud of the target space, using the first images and the second images, wherein the determining includes:
    generating a mesh using the first three-dimensional point cloud; and
    determining the region other than a second region of the target space, the second region being a region for which the mesh is generated.

2. The shooting method according to claim 1, further comprising:
    combining, using second images that have already been shot, a second shooting position and a second shooting orientation of each of the second images, the first images, and the first shooting positions and the first shooting orientations, coordinate systems of the first shooting positions and the first shooting orientations with coordinate systems of the second shooting positions and the second shooting orientations.

3. The shooting method according to claim 1, further comprising:
    displaying the first region or the second region during shooting of the target space.

4. The shooting method according to claim 3, wherein
    in the displaying, information indicating the first region or the second region is displayed superimposed on any one of the first images.

5. The shooting method according to claim 3, wherein
    in the displaying, information indicating the first region or the second region is displayed superimposed on a map of the target space.

6. The shooting method according to claim 3, wherein
    the displaying includes displaying the first region and a reconstruction precision of each region included in the first region.

7. A shooting instruction method executed by a shooting instruction device, the shooting instruction method comprising:
    displaying a first image of a subject on which recognition of attributes is performed;
    getting input to specify a first attribute among the attributes to specify a first region in order to generate a three-dimensional model of the subject, based on second images generated by shooting the subject and on a shooting position and a shooting orientation of each of the second images; and
    outputting at least one of a shooting position or a shooting orientation so that a third image to be used in generating a first three-dimensional model of the first region specified is shot.

8. The shooting instruction method according to claim 7, further comprising:
    detecting a second region for which generating of the three-dimensional model is difficult, based on the second images, the shooting positions, and the shooting orientations; and
    outputting at least one of a shooting position or a shooting orientation so that a fourth image which facilitates generating of a second three-dimensional model of the second region is generated, wherein
    in the outputting corresponding to the first region, the at least one of the shooting position or the shooting orientation is outputted so that the third image which facilitates the generating of the first three-dimensional model of the first region is generated.

9. The shooting instruction method according to claim 8, wherein
    the detecting of the second region includes:
        (i) calculating an edge, on a two-dimensional image, for which an angular difference with an epipolar line based on the shooting position and the shooting orientation is smaller than a predetermined value; and (ii) detecting, as the second region, a three-dimensional region corresponding to the edge calculated, and in the outputting corresponding to the second region, the at least one of the shooting position or the shooting orientation is outputted so that the fourth image for which the angular difference is bigger than the predetermined value is shot.

10. The shooting instruction method according to claim 8, wherein
the second images are frames included in a moving image that is currently being shot and displayed, and
the outputting corresponding to the second region is performed in real time.

11. The shooting instruction method according to claim 10, wherein
in the outputting corresponding to the second region, a shooting direction is outputted.

12. The shooting instruction method according to claim 10, wherein
in the outputting corresponding to the second region, a shooting region is instructed.

13. The shooting instruction method according to claim 7, wherein
the attributes each indicate a type of a target object.

14. The shooting instruction method according to claim 7, wherein
the first image includes a plurality of target objects,
the plurality of target objects each have an attribute,
pixels included in each of the plurality of target objects are associated with the attribute of the target object, and
pixels associated with the first attribute specified are selected to specify the first region.

15. A shooting device comprising:
a processor; and
memory, wherein
using the memory, the processor:
shoots first images of a target space;
generates a first three-dimensional point cloud of the target space based on the first images and a first shooting position and a first shooting orientation of each of the first images;
determines a first region of the target space for which generating a second three-dimensional point cloud is difficult, using the first three-dimensional point cloud and without generating the second three-dimensional point cloud, the second three-dimensional point cloud being denser than the first three-dimensional point cloud, the first region including at least one of a region for which the second three-dimensional point cloud cannot be calculated or a region for which an error between the second three-dimensional point cloud and an actual position is greater than a predetermined threshold;
shoots second images of the first region; and
generates the second three-dimensional point cloud of the target space, using the first images and the second images, wherein
the determining includes:
generating a mesh using the first three-dimensional point cloud; and
determining the region other than a second region of the target space, the second region being a region for which the mesh is generated.

16. A shooting instruction device comprising:
a processor; and
memory, wherein
using the memory, the processor:
displays a first image of a subject on which recognition of attributes is performed;
gets input to specify a first attribute among the attributes to specify a first region in order to generate a three-dimensional model of the subject, based on second images generated by shooting the subject and on a shooting position and a shooting orientation of each of the second images; and
outputs at least one of a shooting position or a shooting orientation so that a third image to be used in generating a first three-dimensional model of the first region specified is shot.

17. The shooting instruction device according to claim 16, wherein
the attributes each indicate a type of a target object.

18. The shooting instruction device according to claim 16, wherein
the first image includes a plurality of target objects,
the plurality of target objects each have an attribute,
pixels included in each of the plurality of target objects are associated with the attribute of the target object, and
pixels associated with the first attribute specified are selected to specify the first region.

\* \* \* \* \*